(12) United States Patent
Strimel et al.

(10) Patent No.: US 12,205,574 B1
(45) Date of Patent: Jan. 21, 2025

(54) SPEECH PROCESSING TECHNIQUES

(71) Applicant: Amazon Technologies, Inc., Seattle, WA (US)

(72) Inventors: Grant Strimel, Preso, PA (US); Ariya Rastrow, Seattle, WA (US); Jonathan Jenner Macoskey, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 398 days.

(21) Appl. No.: 17/208,615

(22) Filed: Mar. 22, 2021

(51) Int. Cl.
  *G10L 15/06* (2013.01)
  *G10L 25/51* (2013.01)

(52) U.S. Cl.
  CPC ............ *G10L 15/063* (2013.01); *G10L 25/51* (2013.01)

(58) Field of Classification Search
  CPC .............................. G10L 15/063; G10L 25/51
  USPC ......................................................... 704/243
  See application file for complete search history.

(56) References Cited

U.S. PATENT DOCUMENTS

| | | | | |
|---|---|---|---|---|
| 10,468,014 | B1* | 11/2019 | Edwards | .................. G10L 15/07 |
| 2002/0065656 | A1* | 5/2002 | Reding | ................... G10L 15/30 |
| | | | | 704/244 |
| 2020/0365148 | A1* | 11/2020 | Ji | ........................... G10L 15/22 |
| 2021/0104223 | A1* | 4/2021 | Beufays | ................ G10L 15/063 |
| 2021/0312907 | A1* | 10/2021 | Moreno | ................... G10L 15/06 |
| 2022/0157294 | A1* | 5/2022 | Li | ........................... G10L 15/00 |

OTHER PUBLICATIONS

Tyagi, V. Sharma, R. Gupta, L. Samson, N. Zhuang, Z. Wang, and B. Campbell, "Fast intent classification for spoken language understanding systems," in Proc. ICASSP, May 2020.
E. Bengio, P.-L. Bacon, J. Pineau, and D. Precup, "Conditional computation in neural networks for faster models," arXiv preprint abs/1511.06297, 11 2015.
Graves, "Adaptive computation time for recurrent neural networks," arXiv preprint abs/1603.08983, 2016.
Y. Jemite, E. Grave, A. Joulin, and T. Mikolov, "Variable computation in recurrent neural networks," in International Conference on Learning Representations, ICLR, Nov. 2017.
T. Bolukbasi, J. Wang, O. Dekel, and V. Saligrama, "Adaptive neural networks for efficient inference," in 34th International Conference on Machine Learning, ICML, vol. 2, 2017.

\* cited by examiner

*Primary Examiner* — Richemond Dorvil
*Assistant Examiner* — Ethan Daniel Kim
(74) *Attorney, Agent, or Firm* — Pierce Atwood LLP

(57) ABSTRACT

Techniques for using multiple machine learning (ML) models, with varying compute costs, for ASR processing is described. The system may include an arbitrator component configured to determine which ML model is to be used to process an audio frame from a sequence of audio frames representing a spoken natural language input. The arbitrator component may switch between the ML models, on a frame-by-frame basis, to reduce an overall compute cost for the entire spoken natural language input. The outputs of the different ML models may be combined to determine the final output for the entire spoken natural language input.

20 Claims, 14 Drawing Sheets

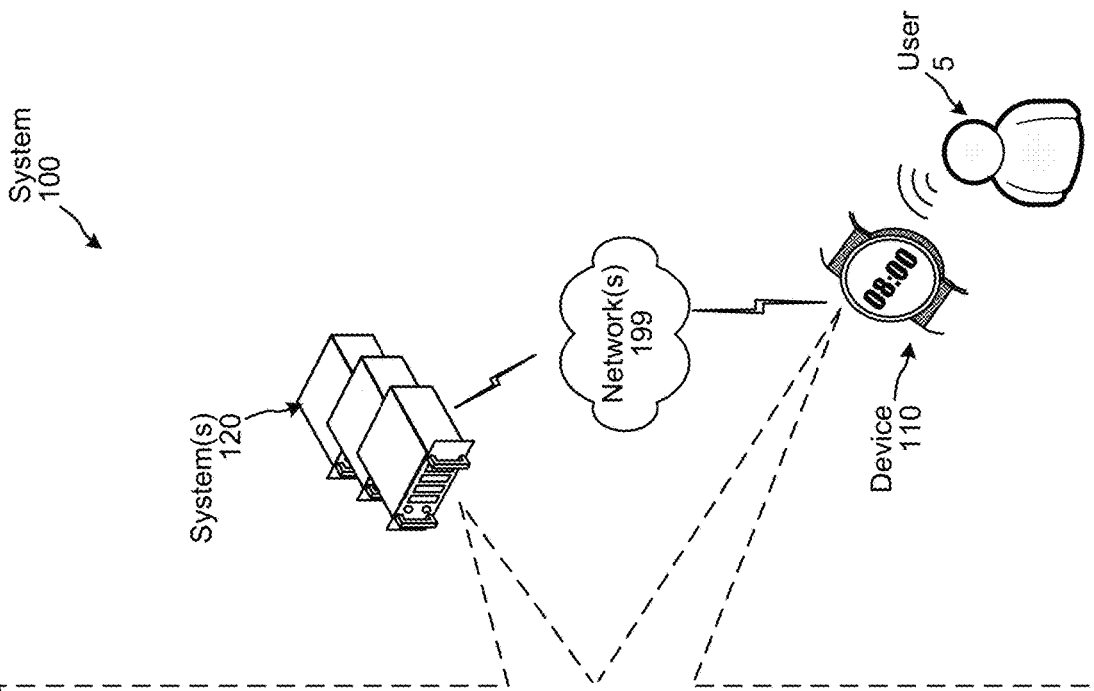
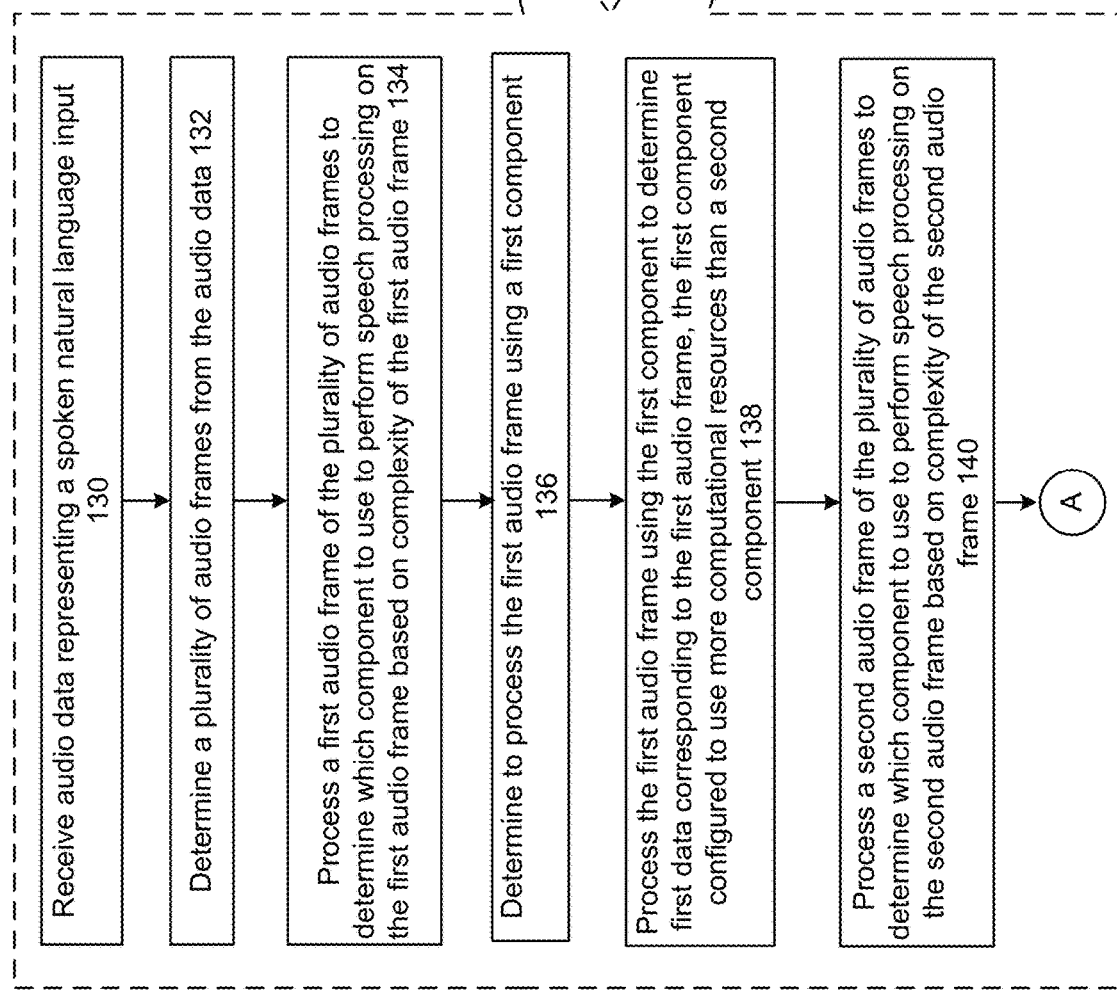
FIG. 1A

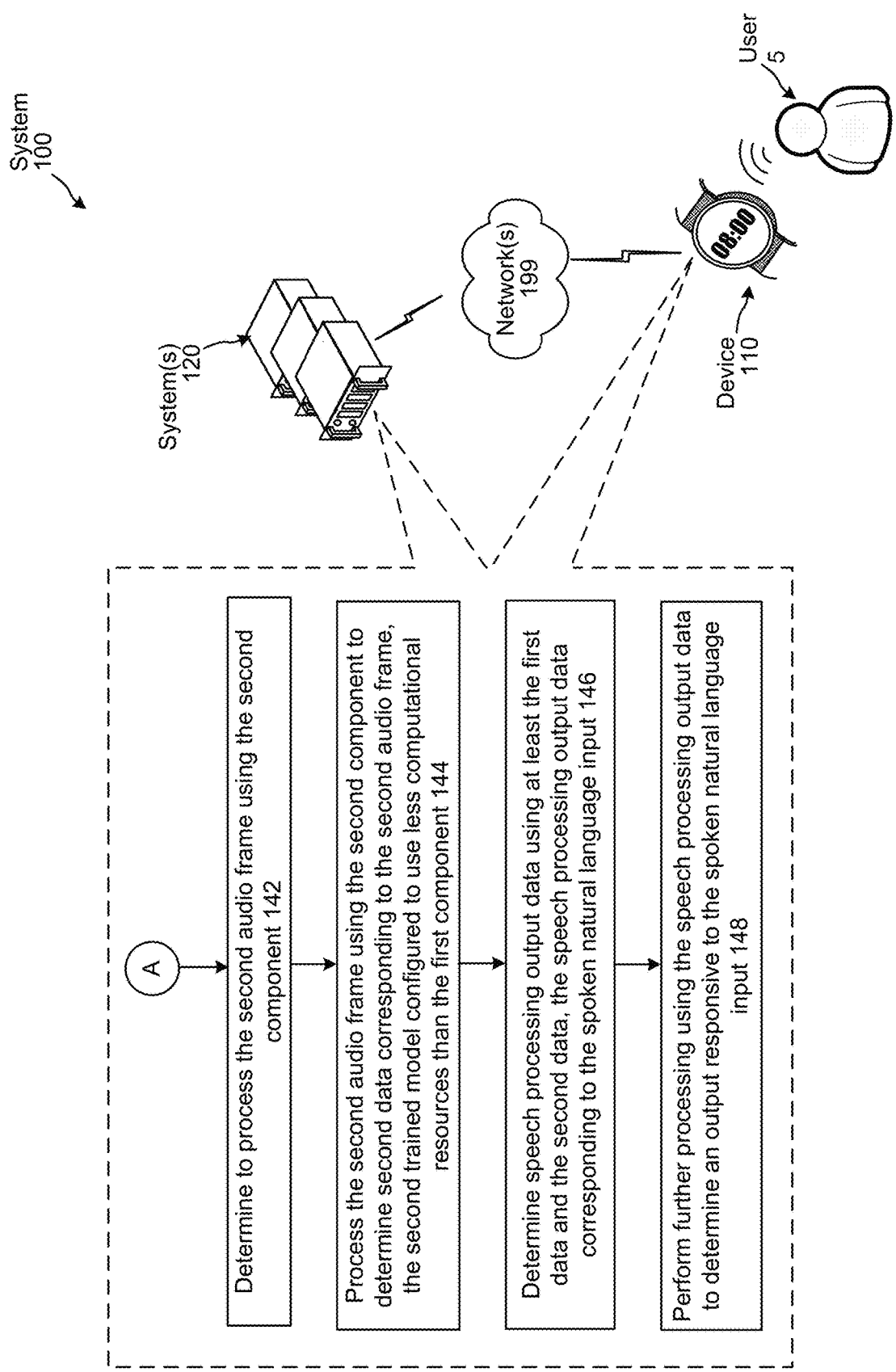

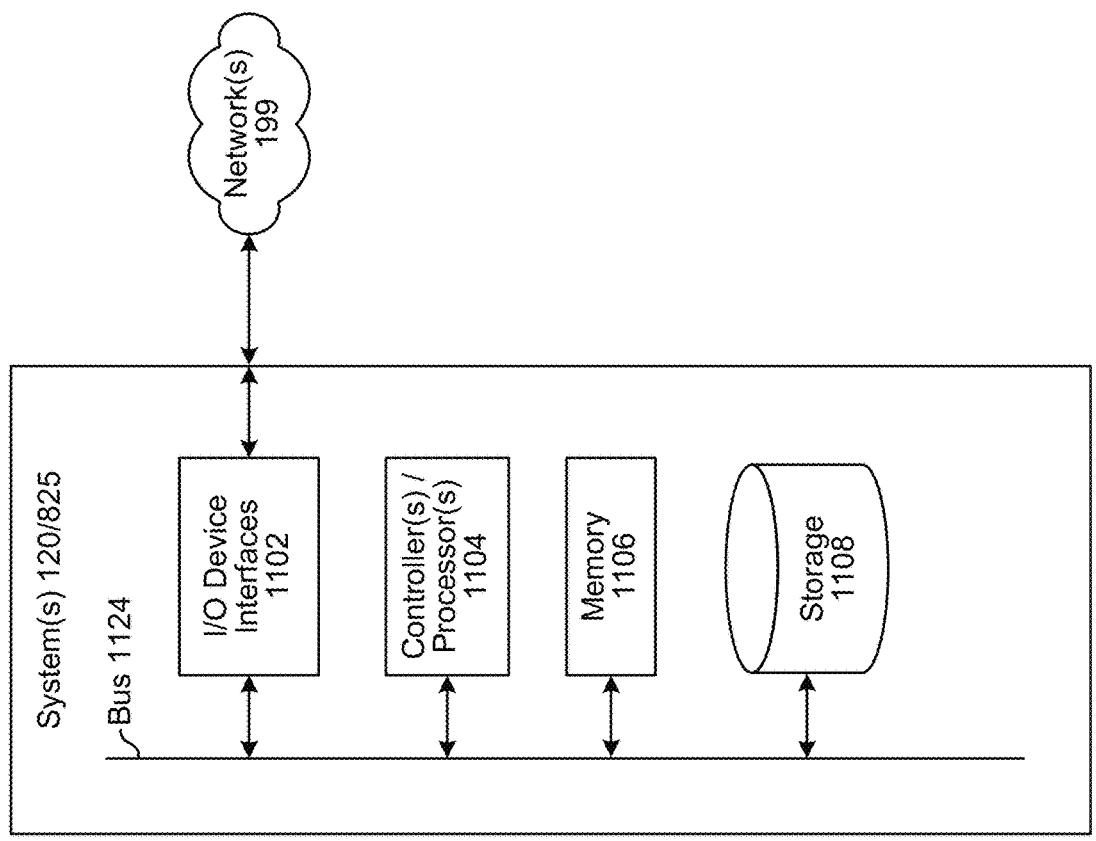

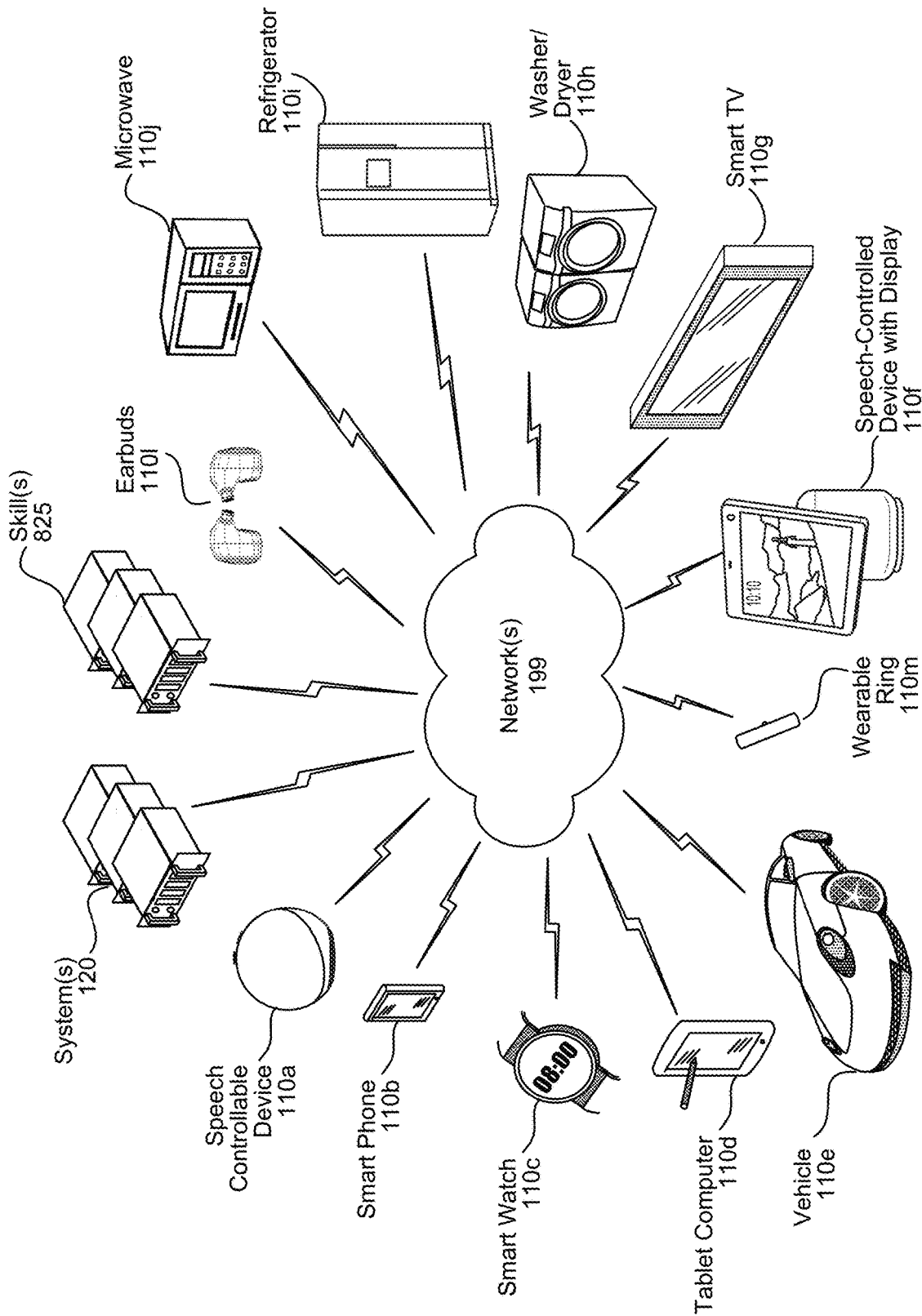

SPEECH PROCESSING TECHNIQUES

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are conceptual diagrams illustrating a system configured to perform speech processing using different components, according to embodiments of the present disclosure.

FIG. 11 is a block diagram conceptually illustrating example components of a system, according to embodiments of the present disclosure.

FIG. 12 illustrates an example of a computer network for use with the overall system, according to embodiments of the present disclosure.

DETAILED DESCRIPTION

Figure 2:
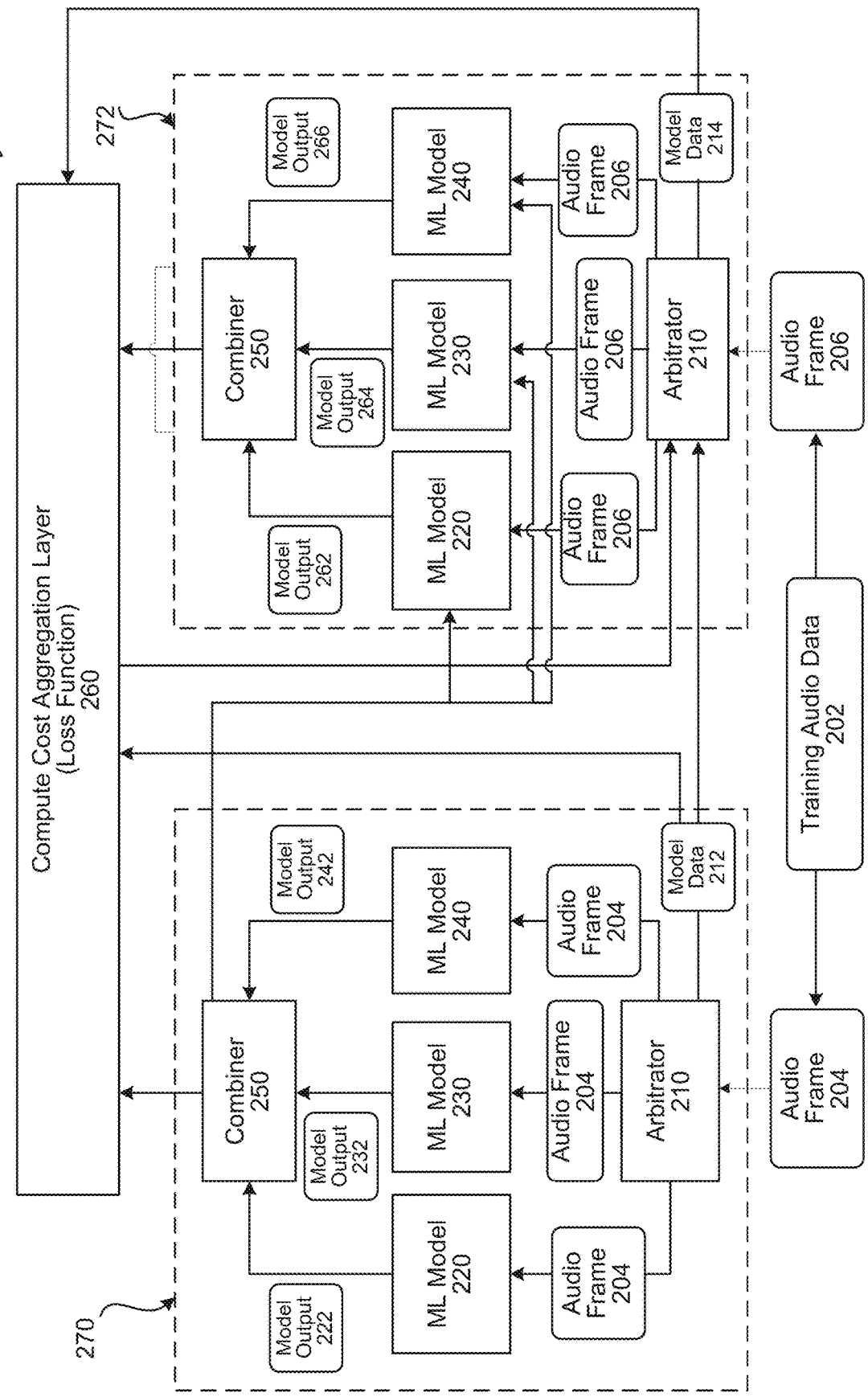
FIG. 2 is a conceptual diagram showing how a system may be trained to perform speech processing using different machine learning models, according to embodiments of the present disclosure.

Automatic speech recognition (ASR) is a field of computer science, artificial intelligence, and linguistics concerned with transforming audio data associated with speech into a token(s) or other textual representation of that speech. Natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) processing component of a system. Text-to-speech (TTS) is a field of computer science, artificial intelligence, and linguistics concerned with transforming text and/or other data into audio data synthesized to resemble human speech.

Certain systems may be configured to perform actions responsive to user inputs. For example, for the user input of "Alexa, play music by <Artist>," a system may output music sung by the indicated artist. For further example, for the user input of "Alexa, turn on the lights," a system may turn on lights based on where the user is located. For another example, for the user input "Alexa, tell me the weather," a system may output (e.g., synthesized speech, display data, etc.) representing the weather for the user's location.

Speech processing may involve an intensive use of computing resources and therefore may be performed using a distributed system where audio is captured by one device having microphones, but other devices (which may be remote from the audio capture device) can assist with the speech processing such as ASR, NLU, command execution, etc. The remote devices may be cloud devices or may be located in a similar environment to a user device, only be differently located (e.g., a home server or the like). In other instances, certain aspects of speech processing may be performed on the user device while other aspects may be performed on other devices. For example, some systems are configured to process audio data representing spoken natural language inputs and perform ASR processing on a user device that captures the audio data. For example, in some systems, a user device may be configured to capture audio data, process the audio data to perform ASR processing, and determine data (e.g., ASR data, text data, etc.) representing the spoken natural language input. Such user devices may include, but are not limited to, a smartphone, a smartwatch, a fitness tracker, a smart speaker, a smart TV, a tablet, and the like. Natural language processing typically involves processing data using multiple machine learning models. To enable user devices to perform ASR processing (or other types of processing, such NLU processing, TTS processing, SLU processing, etc.), sometimes the machine learning models are reduced in size, for example, by compressing the machine learning models, reducing the number of parameters in the machine learning models, etc. Such reduction in size may have a number of advantages for handling some inputs at the cost of, e.g., a relatively higher error rate compared to the full size machine learning models, and thus may degrade the user experience and potentially be undesirable in some instances when used by themselves.

The present disclosure relates to an improved system for performing speech processing involving multiple machine learning models (at least two models) that use varying levels of computational resources and an arbitrator module to decide which machine learning model to use for processing particular segments of input data, such as input audio data. In some embodiments, the system is configured to process input audio data, representing a spoken natural language input, on a frame-by-frame basis, and determine a representation (e.g., ASR output data such as text data, etc.) of the spoken natural language input. For each audio frame of the input audio data, the arbitrator module may determine which machine learning model to use based on the complexity of the sounds (words, sub-words, phonemes) represented in the respective audio frame. For example, one of the machine learning models may use less computational resources (e.g., computing processing, power from the battery/main supply, etc.) and/or time to process an audio frame than the other machine learning models of the system. Such a model may be referred to as a smaller model. In this example, the arbitrator module may determine that a first audio frame is not complex (e.g. is unlikely to include complex speech and more likely to include noise, background audio, or other audio), and therefore to use the smaller model to process the first audio frame. In another example, one of the machine learning models may use more computational resources and/or time to process an audio frame. Such a model may be referred to as a larger model. In this example, the arbitrator module may determine that a second audio frame is complex (e.g. is more likely to include complex speech than noise, background audio, or other audio), and therefore to use the larger model to process the second audio frame.

In some embodiments, the smaller model may be coarser and faster than the larger model, which may be more expressive and slower. For example, the smaller model may have fewer parameters and processing layers than the larger model, enabling the smaller model to process an audio frame quicker than the larger model and using less computational resources. In certain embodiments the larger model may be more likely to produce accurate results than the smaller model.

The arbitrator module of the present disclosure may make a frame-by-frame decision on which machine learning model to use or may allocate audio data to a particular machine learning model using different sizes of sections of audio data (e.g., certain time windows worth of data, sub-frame quantities of data, etc.). For example, the arbitrator module may determine to use a first machine learning model to process a first audio frame and a second audio frame of the input audio data, then determine to use a second machine learning model to process a third audio frame of the input audio data. In switching between machine learning models, the system, in some embodiments, may share state data from the model that processed a first/prior audio frame in a sequence of audio frames of the input audio data with the model that is to process a second/later audio frame in the sequence.

The offered system may combine the outputs of the multiple machine learning models to determine final output data corresponding to an ASR output of the input audio data. For example, a first output of a first machine learning model may correspond to the sound(s) or letter(s) represented in the first audio frame of the input audio data, a second output of a second machine learning model may correspond to the sound(s) or letter(s) represented in the second audio frame of the input audio data, and so on. Using these first and second (and other) outputs (for example by combining the outputs), the system may determine the final output data corresponding to the words/utterance represented in the input audio data.

By using machine learning models with varying levels of computational resources and time to process the input audio data, the system of the present disclosure may offset the larger compute cost of using the larger model to process complex audio frames with the lower compute cost of using the smaller model to process other audio frames. During configuration/training, training audio data may be processed by all of the machine learning models of the architecture, so that the arbitrator module can learn the compute costs and error rates of each of the models.

The techniques of the present disclosure can be used to process input data other than audio data, and perform data processing other than ASR processing. For example, similar techniques can be used to process ASR data (e.g., text data, ASR hypothesis, etc.) and perform NLU processing. In this example, the arbitrator module may use a fast machine learning model (coarser, faster, smaller) to process words with less complex meanings (e.g., "is", "was", etc., or words not relating to intent(s) or entity(ies)), and use a slow machine learning model (more expressive, slower, larger) to process words with more complex meanings (e.g., words related to intent, words that have multiple meanings, words that relate to entities, etc.).

In another example, techniques of the present disclosure, can be used to process image data and perform various image processing tasks, such as, object recognition, facial recognition, image classification, etc. In this example, an arbitrator module may determine to use a fast machine learning model (coarser, faster, smaller) to process less complex pixels of the image data (e.g., background pixels, black/white pixels, etc.), and use a slow machine learning model (more expressive, slower, larger) to process more complex pixels of the image data (e.g., multi-color pixels, etc.).

The techniques of the present disclosure may provide an improved user experience with respect to devices processing spoken inputs. The techniques of the present disclosure, for example, enables faster processing of input data while maintaining higher accuracy.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The systems, devices, components, and techniques can be implemented on a geographic basis to ensure compliance with laws in various jurisdictions and entities in which the components of the systems, devices, components, and/or user are located.

FIGS. 1A-1B illustrate a system 100 configured to perform speech processing using different components, according to embodiments of the present disclosure. Although the figures and discussion of the present disclosure illustrate certain steps in a particular order, the steps described may be performed in a different order (as well as certain steps removed or added) without departing from the present disclosure. As shown in FIGS. 1A-1B, the system 100 may include the device 110 (local to a user 5) and the system(s) 120 in communication across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

In some embodiments, the steps shown in FIGS. 1A-1B may be performed by the system(s) 120. In other embodiments, the steps may be performed by the device 110. In yet other embodiments, some of the steps shown in FIGS. 1A-1B may be performed by the system(s) 120 and other of the steps may be performed by the device 110.

Referring to FIG. 1A, the system(s) 120 or the device 110 receives (130) audio data representing a spoken natural language input. The input may be spoken by the user 5 and audio data representing the input may be captured by one or more microphones of the device 110. In some embodiments, the device 110 may send the audio data to the system(s) 120.

The system(s) 120 or the device 110 determines (132) a plurality of audio frames from the audio data. In some embodiments, the system(s) 120 or the device 110 may divide the audio data into a sequence of audio frames. The size of each audio frame may depend upon system configuration. In one example, each frame may include twenty-five (25) milliseconds of the audio data. In another example, each frame may include twenty-five (25) milliseconds of the audio data, with an overlap of the next frame of 10 milliseconds of the audio data, thus resulting in sliding window processing of the audio data.

The system(s) 120 or the device 110 processes (134) a first audio frame of the plurality of audio frames to determine which component to use to perform speech processing on the first audio frame based on the complexity of the first audio frame. In some embodiments, the system(s) 120 or the device 110 may include at least two components, each of which is configured to perform ASR processing on audio data and output ASR data (e.g., text data, token data, ASR hypothesis, etc.) corresponding to the audio data. The components may be configured to perform ASR acoustic modeling and/or ASR language modeling. In some embodiments, each of the components may employ a different machine learning (ML) model that may be of different sizes and may process audio data at different speeds.

In some embodiments, the system(s) 120 or the device 110 may include an arbitrator component that processes the first audio frame to determine which component to use to perform speech processing. The arbitrator component, in some embodiments, may employ a ML model that is configured to determine which component to use to perform speech processing on the audio frame based on the complexity of the data in the audio frame.

The system(s) 120 or the device 110 determines (136) to process the first audio frame using a first component. The first component may be configured to perform ASR processing and output ASR data. The system(s) 120 or the device 110 processes (138) the first audio frame using the first component to determine first data corresponding to the first audio frame. The first component may be configured to use more computational resources (and time) than a second component. For example, the first component may include a first ML model that may have more processing layers and/or processing nodes than a second ML model of the second component. In another example, the first ML model may have more parameters than the second ML model. The first data may be outputted by the first component, and may be ASR data (e.g., text data, token data, ASR hypothesis, etc.) indicating sounds or letters represented in the first audio frame.

The system(s) 120 or the device 110 processes (140) a second audio frame of the plurality of audio frames to determine which component to use to perform speech processing on the second audio frame based on the complexity of the second audio frame. The second audio frame may be another frame in the sequence of audio frames. The second audio frame may be the frame after the first audio frame, or may be another frame in the sequence of audio frames. The system(s) 120 or the device 110 may use the arbitrator component to process the second audio frame to determine which trained model to use for speech processing.

Referring to FIG. 1B, the system(s) 120 or the device 110 determines (142) to process the second audio data using the second component. The second component may be configured to perform ASR processing and output ASR data. The system(s) 120 or the device 110 processes (144) the second audio frame using the second component to determine second data corresponding to the second audio frame. The second component may be configured to use less computational resources (and time) than the first component. For example, the second component may employ a second ML model that may have less processing layers and/or processing nodes than the first ML model of the first component. In another example, the second ML model may have fewer parameters than the first ML model. The second data may be outputted by the second component, and may be ASR data (e.g., text data, token data, ASR hypothesis, etc.) indicating sounds or letters represented in the second audio frame.

The system(s) 120 or the device 110 determines (146) speech processing output data using at the first data and the second data, where the speech processing output data corresponds to the spoken natural language input. The system(s) 120 or the device 110 may combine the first data and the second data in sequence based on the sequential occurrence of the first audio frame and the second audio frame in the audio data. The system(s) 120 or the device 110 may process all the audio frames of the audio data using either the first component or the second component (or other components depending the system configuration), and combine the respective ASR data outputted by the components to determine the speech processing output data. The first data and the second data may correspond to portions of the spoken natural language input, while the speech processing output data may correspond to the entire spoken natural language input.

The system(s) 120 or the device 110 performs (148) further processing using the speech processing output data to determine an output responsive to the spoken natural language input. For example, the system(s) 120 or the device 110 may perform NLU processing using the speech output data to determine an intent and one or more entities corresponding to the spoken natural language input. For further example, the system(s) 120 or the device 110 may determine one or more skill components (e.g., skill components 890/ 990), based on the intent and the entities, to generate an output responsive to the spoken natural language input.

Figure 4:
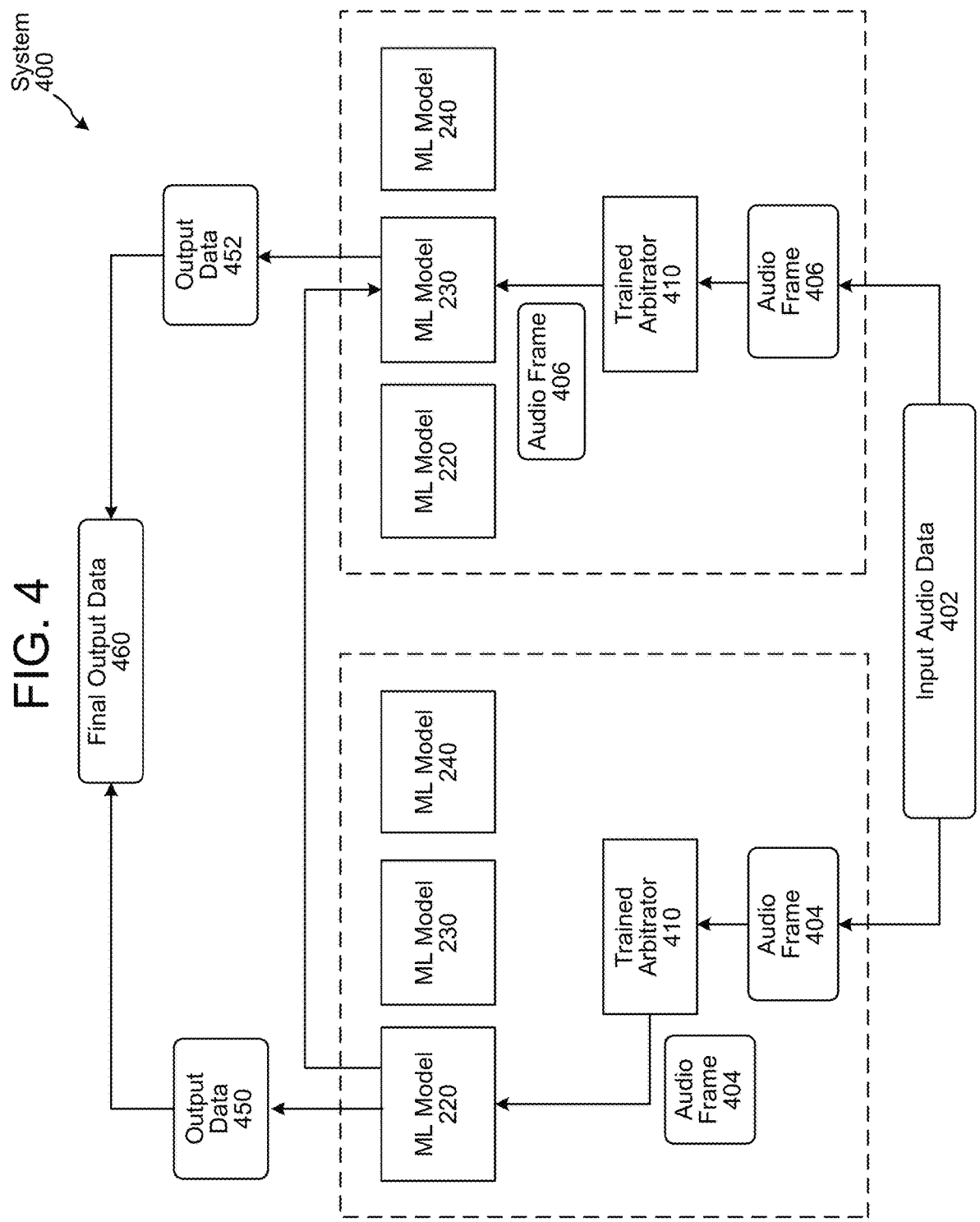
FIG. 4 is a conceptual diagram showing how a system processes audio data using different machine learning models, according to embodiments of the present disclosure.

FIG. 2 is a conceptual diagram showing how a system 200 may be trained to perform speech processing using different machine learning models, according to embodiments of the present disclosure. One or more components of the system 200 may be configured using the system(s) 120 or using another system(s)/server(s). Once trained/configured, one or more components of the system 200 may be stored/used for runtime processing, as shown in FIG. 4. In some embodiments, the system 200 may be configured/trained to perform ASR processing on audio data using different machine learning models that use varying computing resources and time to process audio data. Similar techniques may be used to configure/train a system to perform other types of processing (e.g., NLU processing, image processing, etc.), where machine learning models that use varying amount of computing resources and time are employed, and appropriate types of training data and machine learning models may be used based on system configuration.

In configuring the system 200, one goal is to achieve speedup for processing sequences of audio frames representing a spoken natural language input. The system 200 is configured with the concept that it may be permissible for a portion of the audio frames to be processed at a slower speed as long as the average or effective inference cost across the entire sequence of remains low. The system 200 is configured so that it can account for the accruing compute cost over each sequence and can incorporate this into its objective function. As used herein, compute cost may refer to an amount of computing resources (e.g., memory, processor, etc.) being used to process data and/or an amount of time being used to process data. For example, the compute cost may be based on a number processor cycles used to process data, an amount of time taken to process data, a number of processor cores involved in processing data, etc. Some trained models, depending the size and number of parameters, may use more processor cycles and/or processor cores than other trained models. The compute cost may be based on computing resources and/or time already used to process (a portion of) data and/or may be based on an estimated amount of computing resources and/or time that will be used to process (a remaining portion of) data. For example, the system 200 may track the time spent on processing the instant portion of data, may determine how many processor cycles were used to process the instant portion of data, and/or may determine how many processor cores were used to process the instant portion of data. As a further example, the system 200 may estimate the time, the number of processor cycles, and/or the number of processor cores it will take to process the portion of data based on the amount of data in the portion of data, the features represented in the portion of data, etc.

The system 200 is configured such that it has the flexibility to adapt dynamically during runtime based on its state and input.

In some embodiments, the system 200 may include at least three machine learning (ML) models 220, 230 and 240. Each of the ML models 220, 230 and 240 may be configured to perform ASR processing. In some embodiments, each of the ML models 220, 230 and 240 may be a neural network(s), for example, a recurrent neural network-transformer (RNN-T). In other embodiments, each of the ML models 220, 230 and 240 may be a different type of neural network or a different type of ML model. In some embodiments, the ML models 220, 230 and 240 may be of different kinds. For example, the ML model 220 may be a different kind of ML model than the ML model 230 and/or the ML model 240.

In some embodiments, the ML models 220, 230 and 240 may be fully configured (pre-trained) models and configured to perform ASR processing. Each of the ML models 220, 230 and 240 may be configured to perform ASR processing using varying amounts of compute cost. The variation in compute costs of the ML models 220, 230 and 240 may be a result of the number of processing layers and/or nodes in each of the ML models and/or the number of parameters of each of the ML models. For example, the ML model 220 may be referred to as a larger (slow) model/branch, may have more processing layers/nodes and/or parameters than the ML models 230 and the ML model 240, and may be considered as being more expressive and larger than the ML models 230 and 240. Continuing with the example, the ML model 230 may be referred to as a small (fast) model/branch, may have fewer processing layers/nodes and/or parameters than the ML model 220, and may be considered as being less expressive and smaller than the ML model 220. In this example, the ML model 230 (the small model/branch) may have more processing layers/nodes and/or parameters than the ML model 240, and may be considered as being more expressive and larger than the ML model 240. Continuing with the example, the ML model 240 may be referred to as a smaller (fastest) model/branch, may have fewer processing layers/models and/or parameters than the ML models 220 and 230, and may be considered as being coarser (less expressive) and smaller than the ML models 220 and 230.

Figure 3:
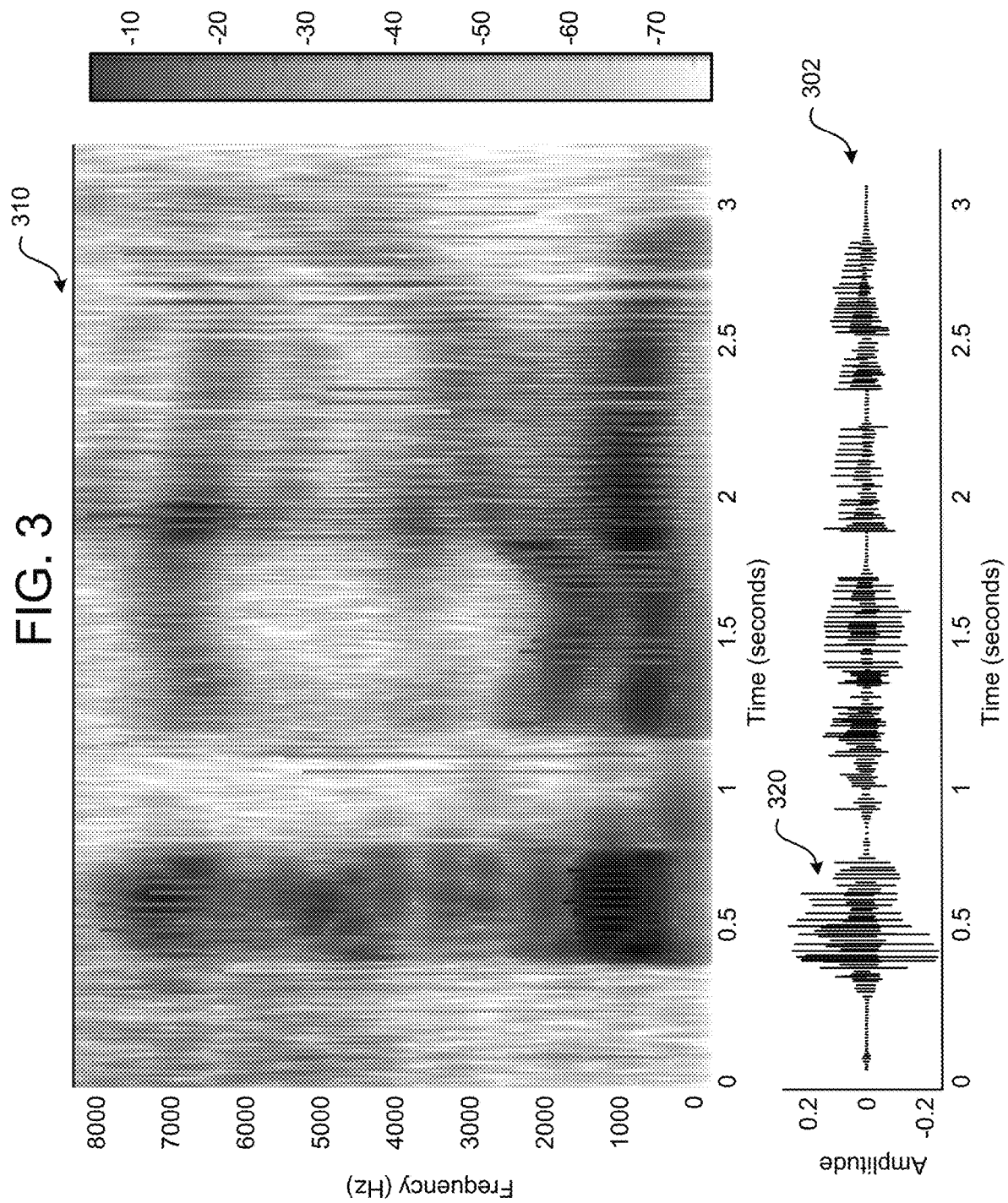
FIG. 3 shows example audio data that may be processed by the system.

The system 200 may also include an arbitrator component 210 that is configured, as described further, to learn the compute costs of the ML models 220, 230 and 240 for different audio frames, and thus be able to select one of the ML models 220, 230 and 240 during runtime to process an input audio frame. Some frames (portions) of the audio data may be complex and contain more information than other frames (portions) of the audio data for decoding via ASR processing. FIG. 3 shows example audio data 302 representing a spoken input by the user 5. A portion of the audio data, shown by 320, may be example complex audio data. FIG. 3 also shows a frequency domain representation (spectrogram) 310 of the audio data. In some embodiments, the system(s) 120 or the device 110 may perform a Fast Fourier Transform (FFT) using the audio data to determine the frequency domain representation of the audio data captured by the device 110. During training, as described further, the arbitrator component 210 may learn that for audio frames that are less complex a smaller model, for example the ML model 240, can be used to process such frames to keep compute costs low while maintaining overall inference accuracy for the entire sequence of audio frames of the audio data. During training, the arbitrator component 210 may learn that for audio frames that are more complex a larger model, for example the ML model 220, should be used to process such frames to maintain inference accuracy. The example audio data 302 and/or the frequency domain representation 320 of the audio data may be the input audio data 402, the audio frame 404 and the audio frame 406 (shown in FIG. 4), the audio frame 508 (shown in FIG. 5B), the audio frame 704 (shown in FIG. 7), and other audio data/frames described herein.

During training, the system 200 may process training audio data 202. The training audio data 202 may include multiple sets of audio data, each representing a spoken natural language input. During a first training iteration, illustrated by 270 in the FIG. 2, the system 200 may process an audio frame 204. The audio frame 204 may be determined from the training audio data 202. The size of the audio frame 204 may depend on system configuration. In some embodiments, the audio frame 204 may be converted to a frequency domain representation, using FFT, prior to being processed by the arbitrator component 210.

The arbitrator component 210 may store the audio frame 204 for later processing, as described below. The arbitrator component 210 may send the audio frame 204 to each of the ML models 220, 230 and 240. Each of the ML models 220, 230 and 240 may perform ASR processing on the audio frame 204 and generate model output 222, 232 and 242, respectively. Each of the model output 222, 232 and 242 may include ASR data, for example, token data, text data, a portion of one or more ASR hypotheses (which may include text data and a corresponding confidence score), and the like. The model output 222, 232, and 242 may correspond to the audio frame 204, and may thus indicate one or more sounds or letters represented in the audio frame 204.

The system 200 may also include a combiner component 250 that may be configured to combine the outputs of the ML models 220, 230 and 240. Further details are provided below. The system 200 may also include a compute cost aggregation component 260 that may be configured to aggregate the compute cost of processing each of the audio frames 204, 206 from the training audio data 202, or otherwise process the compute cost of each of the ML models 220, 230 and 240 in processing the audio frame 204 and the audio frame 206. The compute cost aggregation component 260 may also implement a loss (objective) function for training the arbitrator component 210, which in this case may be to limit the compute cost of processing the training audio data 202 while maintaining a prediction accuracy.

During a second training iteration, illustrated by 272 in the FIG. 2, the system 200 may process an audio frame 206. The audio frame 206 may be determined from the training audio data 202. The size of the audio frame 206 may depend on system configuration. In some embodiments, the audio frame 206 may be converted to a frequency domain representation, using FFT, prior to being processed by the arbitrator component 210.

During the second training iteration, the arbitrator component 210 may use model data 212 generated by the arbitrator component 210 during the first training iteration 270. The model data 212 may represent weights, parameters and other data learned by the arbitrator component 210 from the processing of the audio frame 204 by the ML models 220, 230 and 240. During the second training iteration, the arbitrator component 210 may also use data from the compute cost aggregation component 260 to monitor the accumulated compute cost in processing the audio frames thus far. The compute cost aggregation component 260 may implement the loss function for training the system 200.

During the second training iteration, the arbitrator component 210, in a similar manner as the first training iteration, send the audio frame 206 to each of the ML models 220, 230 and 240 for processing. Additionally, each of the ML models 220, 230 and 240 may use data from the combiner 250, where this data may represent an aggregation of the hidden state data from each of the ML models 220, 230 and 240 during the first training iteration 270 in processing the audio frame 204. Each of the ML models 220, 230 and 240 may generate model output 262, 264 and 266, respectively. Each of the model output 262, 264 and 266 may include ASR data, for example, token data, text data, a portion of one or more ASR hypotheses (which may include text data and a corresponding confidence score), and the like. The model output 262, 264 and 266 may correspond to the audio frame 206, and may thus indicate one or more sounds or letters represented in the audio frame 206.

The combiner component 250, similar to the first training iteration, may combine the model outputs 262, 264 and 266. The cost aggregation layer 260, similar to the first training iteration, may aggregate or otherwise process the compute costs of each of the ML models 220, 230 and 240 processing the audio frame 206.

The arbitrator component 210 may generate model data 214, which may be used by the arbitrator component 210 during a third/next training iteration (not shown). The model data 214 may correspond to weights, parameters and other data learned by the arbitrator component 210 from the ML models 220, 230 and 240 processing of the audio frame 206. The model data 214 may configure the arbitrator component 210 to determine which ML model 220, 230 or 240 to use to process an audio frame. The model data 214 (and 212) may be provided to the compute cost aggregation layer 260 for calculations using the loss function.

In some embodiments, the arbitrator component 210 may process the audio frame 204, 206 to learn features of the respective audio frames. The arbitrator component 210 may associate the aggregated compute cost with the respective audio frame 204, 206. Using such association, the arbitrator component 210 may learn a correlation/association/correspondence between the features of the audio frame and the compute cost. For example, the arbitrator component 210 may determine that the fastest ML model 240 was capable of outputting an inference with high accuracy for the audio frame 204 with a relatively low compute cost, and based on this, the arbitrator component 210 may learn that an input audio frame having features similar to the audio frame 204 should be processed by the ML model 240. For further example, the arbitrator component 210 may determine that the slow ML model 220 was the only one capable of outputting an inference with high accuracy for the audio frame 206, and based on this, the arbitrator component 210 may learn that an input audio frame having features similar to the audio frame 206 should be processed by the ML model 220. The arbitrator component 210 trained/configured as described above results in a system capable of maintaining high inference accuracy while keeping compute costs low. The arbitrator component 210 enables branching of processing of audio data, on a frame-by-frame basis, execute a set of low-compute pathways for most audio frames while relying on heavier compute capacities on less frequent instances, thus lowering the overall compute cost for the entire sequence of frames of the audio data.

After training, the arbitrator component 210 may be stored as a trained arbitrator component 410 shown in FIG. 4 for use during runtime processing. FIG. 4 is a conceptual diagram showing how a system 400 processes audio data using different machine learning models, according to embodiments of the present disclosure. One or more components of the system 400 may be included in the system(s) 120 as part of an ASR component 850 (shown in FIG. 8). In other embodiments, one or more components of the system 400 may be included in the device 110 as part of an ASR component 950 (shown in FIG. 9).

The system 400 may include multiple ML models, for example, the ML models 220, 230 and 240. In some embodiments, the system 400 may include fewer or more than (at least two ML models) three ML models. As described above in connection with FIG. 2, each of the ML models 220, 230 and 240 may be configured to perform ASR processing. Each of the ML models 220, 230 and 240 may result in varying compute costs based on each model's configuration as described above in connection with FIG. 2. For example, the ML model 220 may be considered a larger model/branch, the ML model 230 may be considered a small model/branch and the ML model 240 may be considered a smaller model/branch.

The system 400 may process input audio data 402 as follows. The input audio data 402 may correspond to, for example, a natural language input spoken by the user 5 and captured by one or more microphones of the device 110 shown in FIGS. 1A-1B. The system 400 may determine multiple audio frames from the input audio data 402, for example, audio frame 404 and audio frame 406. It should be understood that more than two audio frames may be determined from the input audio data 402 even though only two audio frames are shown in FIG. 4. The size of the audio frame 404 and 406 may depend on system configuration. In some embodiments, the system 400 may convert the audio frame 404 and 406 to a frequency domain representation prior to processing by the trained arbitration component 410.

The trained arbitration component 410 may be configured, as described above in connection with FIG. 2, to process an audio frame (portion of input audio data) and determine which of the ML models 220, 230 or 240 is to be used to process the audio frame. For example, as shown in FIG. 4, the trained arbitration component 410 may process the audio frame 404, and determine that the audio frame 404 is to be processed by the ML model 220. The trained arbitration component 410 may determine that the audio frame 404 is complex and contains more information that needs to be decoded using a larger, more expressive ML model, such as the ML model 220.

After making such a determination, the trained arbitration component 410 may send the audio frame 404 to the ML model 220 for processing. The ML model 220 may process the audio frame 404 and generate output data 450, which may be ASR data (e.g., text data, token data, portion of an ASR hypothesis (including text data and a corresponding confidence score)) corresponding to a sound(s) or letter(s) represented in the audio frame 404.

The trained arbitration component 410 may process the audio frame 406 and determine that the ML model 230 is to be used to process the audio frame. In response to this determination, the trained arbitration component 410 may send the audio frame 406 to the ML model 230 for processing. In some embodiments, the system 400 may send model data (e.g., hidden state data) from the ML model 220, to the ML model 230 to use for processing the audio frame 406, thus, the ML model 230 may use contextual information from a previous audio frame (audio frame 404) in the sequence in decoding the instant audio frame (audio frame 406). The ML model 230 may process the audio frame 406 and the output data 450 to generate output data 452, which may be ASR data (e.g., text data, token data, portion of an ASR hypothesis (including text data and a corresponding confidence score)) corresponding to a sound(s) or letter(s) represented in the audio frame 406.

In some embodiments, the system 400 may send state data from the ML model 220, determined during processing of the audio frame 404, to the ML model 230 to use when processing the audio frame 406. The state data of the ML model 220 may be of a different dimension than the data used by the ML model 230 (for example, based on the number of layers/nodes in the ML model, the types of layers in the ML model, etc.). For the ML model 230 to use the state data from the 220, the system 400 may perform dimension matching techniques. For example, the system 400 may determine a first dimension corresponding to the state data from ML model 220, may determine a second dimension corresponding to the data used by the ML model 230, may determine that the first dimension is greater than the second dimension, and may project down the state data from the ML model 220, before providing it to the ML model 230 for use, so that the projected state data corresponds to the second dimension.

The trained arbitration component 410 may process further audio frames (not shown) from the input audio data 402. After all the audio frames from the input audio data 402 are processed, the system 400 may determine final output data 460. In some embodiments, the system 400 may determine portions of the final output data 460 as the audio frames of the input audio data 402 are processed. The final output data 460 may correspond to the entire input audio data 402, for example, representing the words in the natural language input spoken by the user 5. The system 400 may combine the output data 450 and the output data 452 (and other output data corresponding to other audio frames) to determine the final output data 460.

Figure 5A:
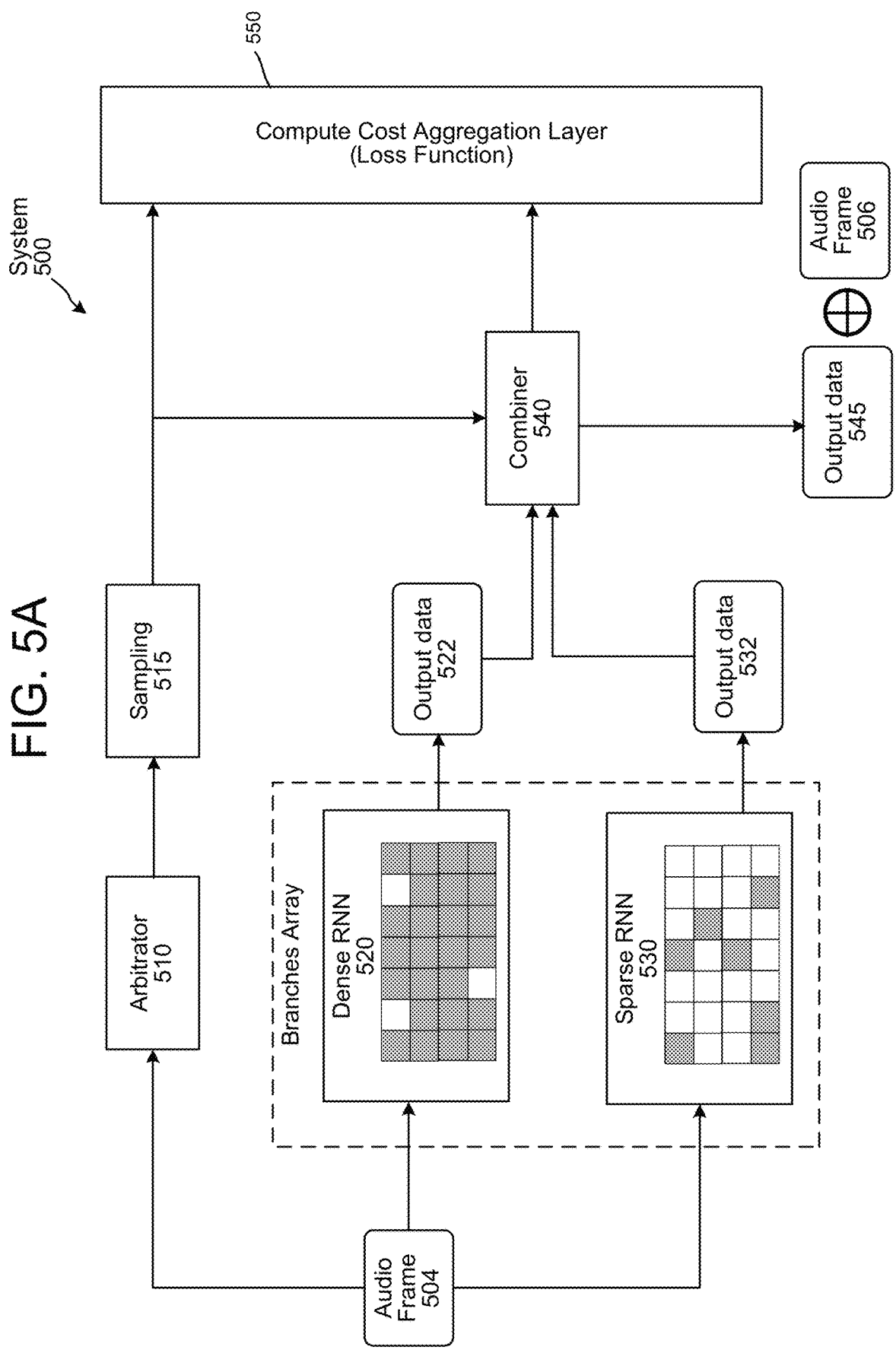
FIG. 5A is a conceptual diagram showing how another example system may be trained to perform speech processing using different machine learning models, according to embodiments of the present disclosure.
Figure 5B:
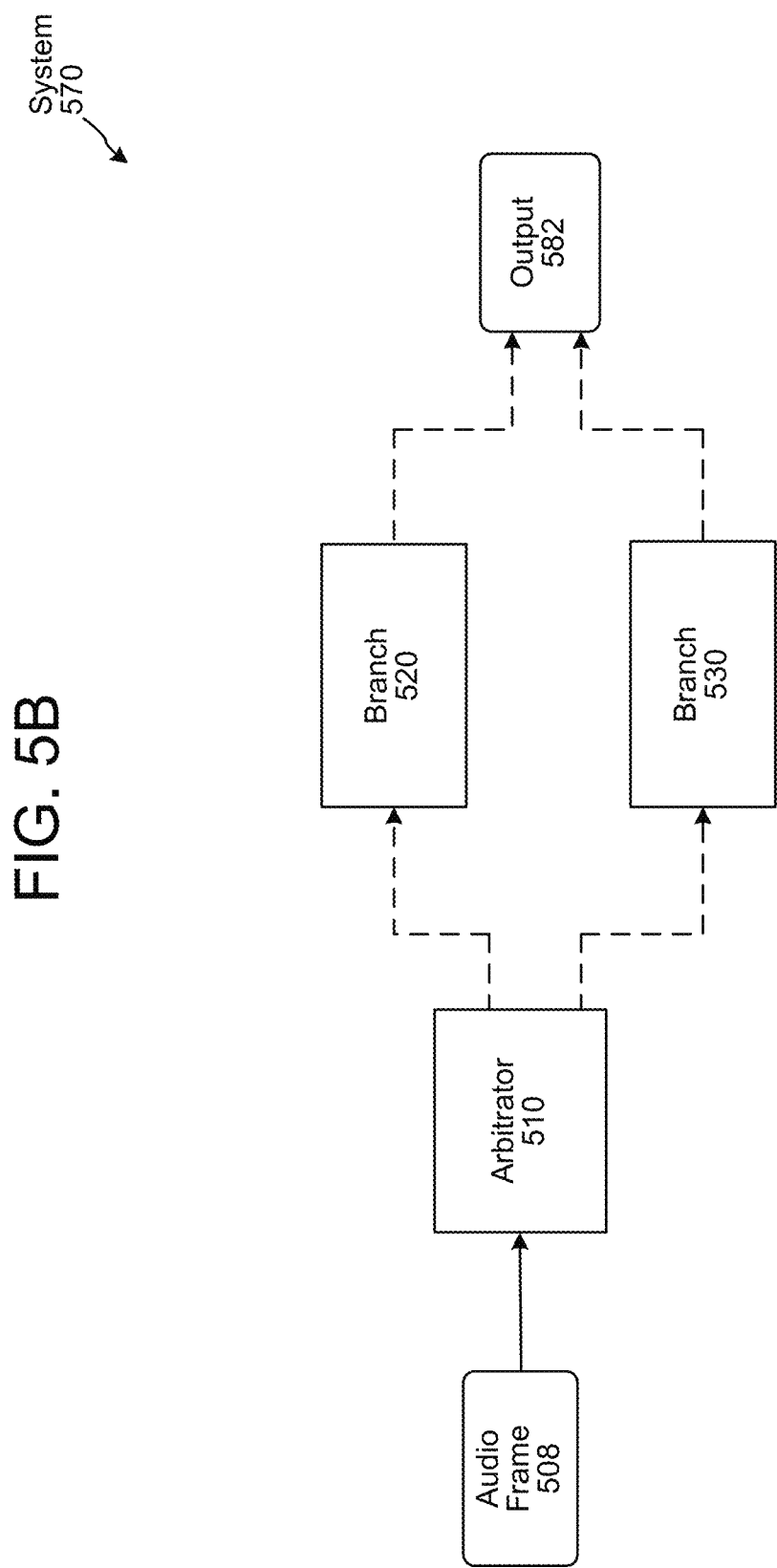
FIG. 5B is a conceptual diagram showing how the example system of FIG. 5A processes audio data using different machine learning models, according to embodiments of the present disclosure.

FIG. 5A shows another embodiment of how a system 500 may be trained to perform speech processing using different machine learning models, according to embodiments of the present disclosure. One or more components of the system 500 may be configured using the system(s) 120 or using another system(s)/server(s). Once trained/configured, one or more components of the system 500 may be stored/used for runtime processing, as shown in FIG. 5B. In some embodiments, the system 500 may be configured/trained to perform ASR processing on audio data using different machine learning models that use varying computing resources and time to process audio data. Similar techniques may be used to configure/train a system to perform other types of processing (e.g., NLU processing, image processing, etc.), where machine learning models that use varying amount of computing resources and time are employed, and appropriate types of training data and machine learning models may be used based on system configuration.

At a high level, the system 500 works by using an arbitrator component 510 to pivot between which inference branch is taken for each audio frame. The arbitrator component 510 may perform an arbitration over a branching array consisting of, for example, branch 520 and branch 530, each of which is a mutually exclusive set of pathways, and one of which is chosen to process an audio frame 504. Each of the branches 520 and 530 may retain its own set of parameters. As such, the branches can have different compute costs and/or can be specialized to model different sub-distributions. During training, the system 500 may train both the arbitrator component 510 and the branches 520, 530 to give the system 500 the capability to act in a dynamic capacity on a frame-by-frame basis.

The dynamic capacity of the system 500 can accelerate the system's total inference time by using branches with smaller parameter count to handle a majority of audio frames of a spoken natural language input, while relying on the heavy-hitting branches to maintain accuracy on other portion of the audio frames. The arbitrator component 510 may learn to arbitrate between the branches to minimize total compute cost while maintaining a certain level of accuracy. The system 500 may include a compute cost aggregation layer 550, which may aggregate the decisions (the compute cost of the selected branch processing a respective audio frame) of the arbitrator component 510 across the full sequence of audio frames in the input audio data, and may add this cumulative compute cost to a loss function (used to train the system 500) as the loss.

During training, the arbitrator component 510 learns to select a branch to maximize the inference accuracy while keeping compute costs low. In some embodiments, the system 500 uses a sampling component 515 that corresponds to a stochastic node which samples from the output of the arbitrator component 510 (e.g., a probability distribution) for exploration purposes. In some embodiments, to make the system differentiable over discrete distributions and enable gradients to flow through all the branches 520 and 530, a combiner component 540 is used during the training steps. The combiner component 540 may not be used during the runtime steps, as the respective audio frames of the input audio data would only pass through (be processed by) one of the branches.

The system 500 shown in FIG. 5A illustrates an example design of the systems and techniques of the present disclosure. This example system 500 includes two parallel RNNs for the branches, where the RNN for the branch 520 may be a dense RNN (e.g., larger, being more expressive, robust, etc.) and the RNN for the branch 530 may be a sparse RNN (e.g., smaller, less expressive, coarser, etc.). As shown in the FIG. 5A, the output of the arbitrator component 510 may be forwarded directly to the compute cost aggregation layer 550 for use in the loss function for training. In some embodiments, the compute cost aggregation layer 550 may penalize the use of the dense RNN/the branch 520 more than the use of the sparse RNN/the branch 530. In this example system 500, each of the RNNs/branches 520, 530 are also trained, for ASR processing, along with the arbitrator component 510, and each of the branch 520, 530 has an opportunity to learn different things, with the sparse RNN/branch 530 being well optimized for the "typical case" and the dense RNN/branch 520 having the capacity to handle atypical, harder cases.

During training, an input audio frame 504 may be processed by the arbitrator component 510, the branch 520 and the branch 530. The output of the arbitrator component 510 may be sampled by the sampling component 515. The output of sampling component 515 may be provided to the compute cost aggregation layer 550 for incorporating into the loss function, and provided to the combiner component 540 for aggregating the outputs of the arbitrator component 510 with the outputs of the branches. An output 522 of the branch 520 and an output 532 of the branch 530 may be provided to the combiner component 540. The output data 545 of the combiner component 540 (e.g., representing the processing of a first audio frame in a sequence of training audio frames) may be used during a second/next training iteration while processing a second/next audio frame 506 in the sequence of training audio frames. After all the audio frames in the training sequence are processed, the compute cost aggregation layer 550 may determine a total compute cost for the entire training sequence.

FIG. 5B shows a system 570 that may be used for runtime operations, after the system 500 shown in FIG. 5A has been trained/configured. During runtime operations to process audio frames of the input audio data, as shown in FIG. 5B, the system 570 may use the arbitrator component 510, the branch 520 and the branch 530. For example, the audio frame 508 may be processed by the arbitrator component 510 to determine which of the branch 520 or 530 to use to process the audio frame. Based on that determination, the branch 520 or the branch 530 may process the audio frame 508 to generate an output 582 corresponding to a sound(s) or letter(s) represented in the audio frame 508. The output of the branches 520, 530 may be ASR data. In this manner, the system 570 may process the other audio frames of the input audio data, generate outputs corresponding to the sound(s) or letter(s) represented in each respective audio frame, and determine final output data using the outputs corresponding to each audio frame in the input audio data. The final output data may correspond to the words represented in the input audio data/spoken natural language input.

Figure 6:
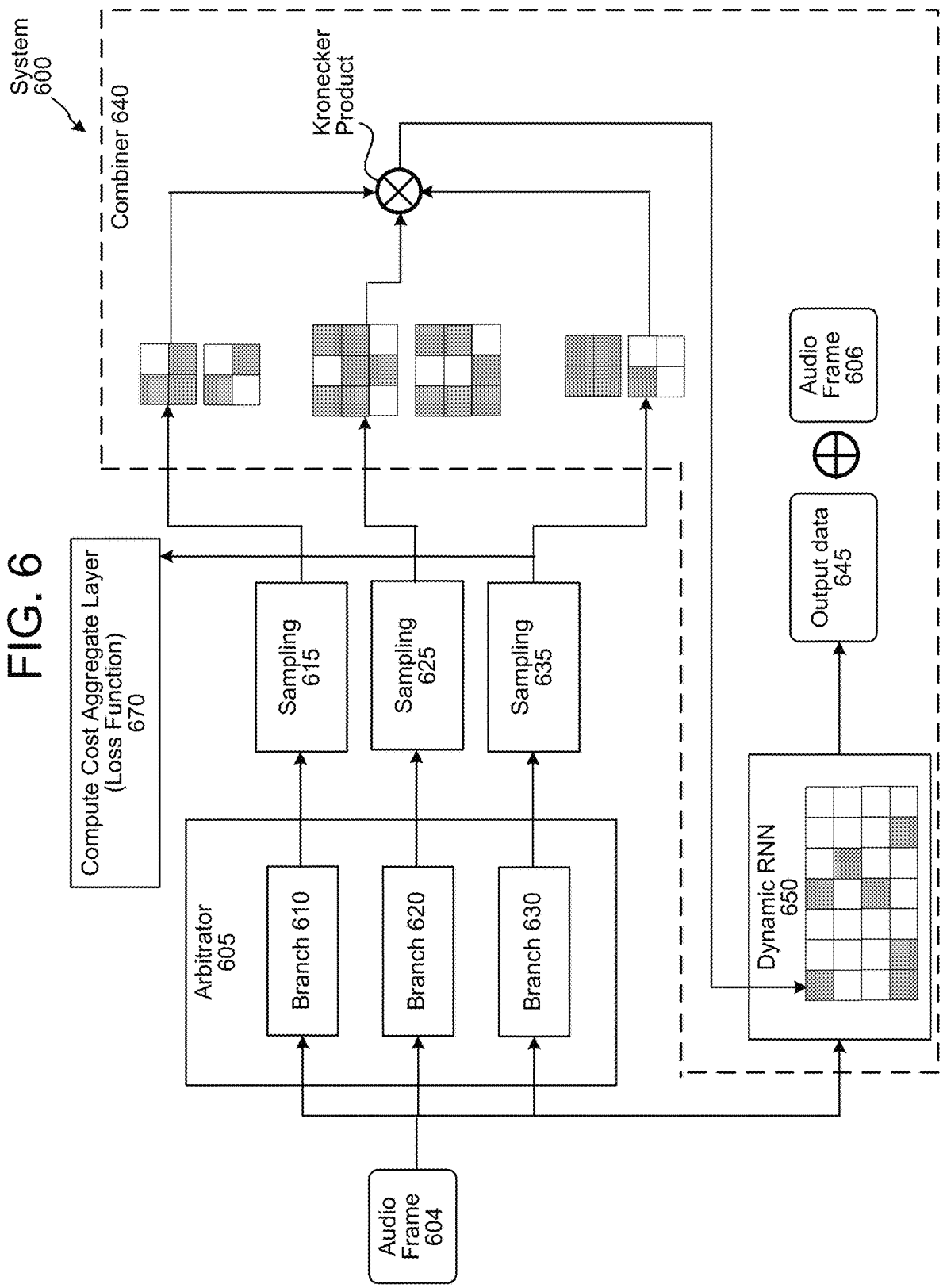
FIG. 6 is a conceptual diagram showing how another example system may be trained to perform speech processing using different machine learning models, according to embodiments of the present disclosure.

FIG. 6 shows another example system 600 based on the systems and techniques of the present disclosure. The system 600 may employ matrix decomposition methods, where switching between a set of building blocks is used at each time step of training to construct a full size kernel matrix (e.g., matrix 650) on-the-fly. In some embodiments, the building blocks are the branches 610, 620 and 630 (as part of the arbitrator component 605) and the component conducting the ASR processing/inference is the combiner component 640. In an example embodiment, the combiner component 640 may use a Kronecker product to aggregate the outputs of the building blocks. Using this approach the system 600 can achieve variety and network capacity without paying the cost of maintaining separate individual cells. This may also help to load weights into caches since only constituent pieces are moved instead of full matrices. The outputs of the sampling components 615, 625 and 635 may be provided to the compute cost aggregate layer 670 to aggregate the cost of processing the audio frame 604 and incorporate it into the loss function. The output data 645 of the dynamic RNN 650 may be used to process the next audio frame 606 in the sequence of audio frames.

In some embodiments, a runtime system based on the system 600 may include the arbitrator component 605, along with the branches 610, 620 and 630, and the combiner 640. During runtime, each of the branches 610, 620 and 630 of the arbitrator component 605 may process an input audio frame, and the combiner 640 may determine which part of the dynamic RNN 650 to use for processing the input audio frame.

Figure 7:
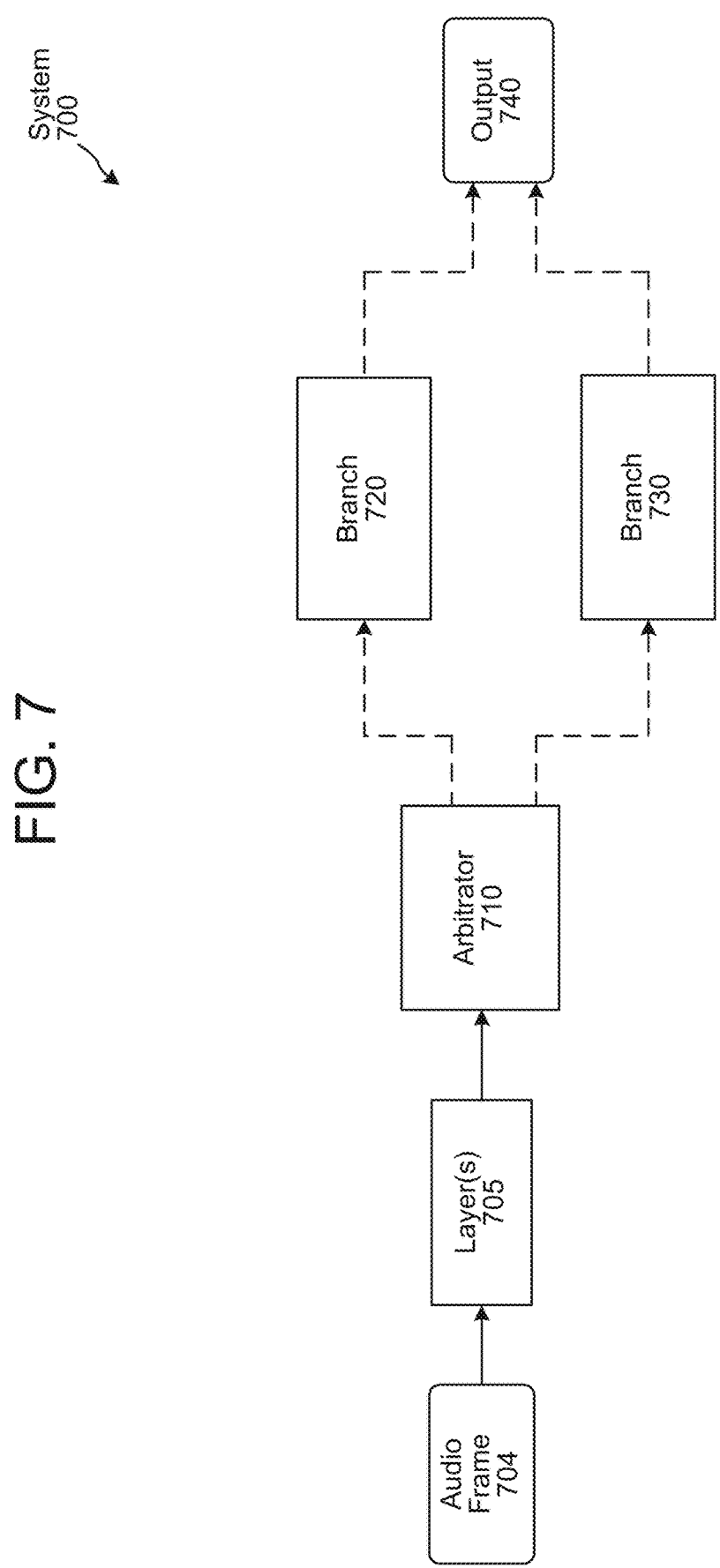
FIG. 7 is a conceptual diagram showing how another example system processes audio data using different machine learning models, according to embodiments of the present disclosure.

FIG. 7 is a conceptual diagram showing how another example system 700 processes audio data (during runtime operations) using different machine learning models, according to embodiments of the present disclosure. The system 700 may include one branch 720 configured to perform ASR processing and may be a sparse model. The system 700 may also include a second branch 730 configured to perform ASR processing and may be a dense model. In some embodiments, the first few processing layers of the branches 720 and 730 may be the same, that is, configured to process an audio frame to extract features. A layer(s) 705 may correspond to or be equivalent of the first few processing layers of the branches 720 and 730. In this example system 700, an audio frame 704 may be processed using the layer(s) 705 to generate feature data, and the arbitrator component 710 may process the feature data corresponding to the audio frame 704 to determine which of the branches 720 or 730 to be used to further process the audio frame 704. In this case, the arbitrator component 710 may forward the feature data (instead of the raw audio frame 704) to the selected branch to determine output data 740. The layer(s) 705 may be determined after the branches 720 and 730 are trained (for example, according to the techniques described in connection to FIG. 5A). For example, the first/bottom two layers of the trained branches may be used to determine the layers 705. For runtime operations, the branches 720 and 730 may not have the first/bottom two layers, as they are encompassed in the layers 705.

Further details on some of the components described above are now provided. As shown, some of the example systems may include similar components. For example, each example system includes an arbitrator component. In some embodiments, the arbitrator component (e.g., 210, 410, 510, 605, and 710) may be a ML model, such as a neural network. In some embodiments, the arbitrator component may be a RNN or a DNN. The arbitrator component may be a gating mechanism/arbitration mechanism to switch between branches/ML models for processing audio frames in a sequence of audio frames. The arbitrator component may be very fast in its processing/execution, for example, in an order(s) of magnitude smaller than the branches/ML models that it is toggling between. The input to the arbitrator component may be an audio frame or another portion of the input audio data or training audio data. In some embodiments, the input to the arbitrator component may also include the output from the previous processing iteration of a previous audio frame in the input audio data or training audio data. The output of the ML model of the arbitration component, in some embodiments, may be a probability distribution corresponding to the branches/ML models (depending on system configuration), where the distribution may indicate a likelihood of each branch/ML model should be the one to be used for processing the audio frame. For example, the output of the arbitration component 410 (of FIG. 4) may be {0.7, 0.2, 0.1} corresponding to {ML model 220, ML model 230, ML model 240}, based on which the arbitration component 410 may choose the ML model 220 for processing the instant audio frame. In some embodiments, the output of the ML model of the arbitrator component may be logits.

In some embodiments, the sampling components 515 (shown in FIG. 5A) and the sampling components 615, 625 and 635 (shown in FIG. 6) may be a softmax node/layer, for example, a Gumbel-Softmax node. The sampling components 515, 615, 625 and 635 may convert the output (e.g., probability distribution or logits) from the arbitration component to a hard decision sampled from that distribution. For example, the output of the sampling component 515 may be {0, 1}, indicating that the branch 530 should be used to process the instant audio frame. In employing the Gumbel-Softmax node, the sampling components 515, 615, 625 and 635 may allow gradients to flow through non-differentiable stochastic nodes during backpropagation. In some embodiments, a sampled one-hot encoded vector y is drawn from distribution $p\theta(y)$. The parameterization of the distribution may be defined by logits $\theta$ which will be learned during training. The Gumbel-Softmax may have a temperature hyperparameter associated with it, and denoted as $\tau$, which controls the "discreteness" of the one-hot sample. $\tau$ will be adjusted with a callback on each epoch during training to make the sample more binary as the model converges. In some embodiments, the Gumbel-Softmax node, i.e., the sampling component, is only executed during training operations, while the max coordinate/probability of the arbitration component is used during runtime operations. In some embodiments, the runtime operations may also include the sampling component to process the probability distribution outputted by the arbitration component and output a hard decision on which branch/ML model to choose for processing the instant audio frame.

The combiner component 250 (shown in FIG. 2), 550 (shown in FIG. 5A) and 660 (shown in FIG. 6) may be used during training operations only, and not during runtime operations. The combiner component 250, 550 and 660 may merge the output of each branch/ML model during training. For the setting where the branches are individual cells or models (as shown in FIGS. 2 and 5), the combiner component 250 and 550 may execute a component-wise multiplication from the sampling against the outputs and states from each of the branches/ML models. The combined output may be forwarded for the next training step/iteration, and the merged output is cycled back through the combiner component 250 and 550 for the next audio frame processing. Similarly, in the case where the branches are matrix-building blocks as shown in FIG. 6, the combiner component 640 may be the operation which merges the blocks and generates the kernel for the cell in the final matrix 650.

The outputs of the different branches/ML models may have different dimensions (e.g., a different size vector or a different size matrix). In some embodiments, the combiner component 250, 550 and 660 may perform dimension matching techniques before combining the outputs of the different branches/ML models. In one example embodiment, the combiner component 250 may project up the output of the faster ML model 240 to match the dimension of the slow ML model 220. In another example embodiment, the combiner component 540 may project down the output of the dense RNN/branch 520 to match the dimension of the sparse RNN/branch 530.

The compute cost aggregation component 260 (shown in FIG. 2), 550 (shown in FIG. 5A) and 670 (shown in FIG. 6) may be a layer/component, used during training operations, to analyze the compute cost of the decisions made by the arbitrator component. The compute cost aggregation component 260, 550 and 670 may process the sequence of decisions made by the arbitrator component, and may compute a cost over the entire sequence of audio frames in the input training audio data. The compute cost aggregation component 260, 550 and 670 may also add metrics on the discreteness of the sampling component and the selected branch frequency statistics. In some embodiments, the compute cost aggregation component 260, 550 and 670 may implement a loss function (used by the system to train the arbitrator component and/or the branches/ML models) that is based on the compute cost of the entire sequence of audio frames and the prediction accuracy of the various ML models/branches. In some embodiments, the loss function may also be based on the length of the audio data/natural language input.

In configuring the systems of the present disclosure, the compute cost of each of the branches/ML models may be approximated/estimated. For example, the compute cost of a branch/ML model may be measured based on its sparsity, where a more sparse kernel matrix implies a proportionally faster inference/processing when executing on a device.

Some embodiments may use other techniques in addition to the ones described above for training/configuring the systems of the present disclosure. For example, latency reduction techniques such as, sparsity-aware training, SVD matrix decomposition, and Kronecker product compression, may be used. These techniques may be tools to dial and accelerate the different branches/ML models.

In some embodiments, the present disclosure may use pre-training techniques in training/configuring the systems 200, 500 and 600. For example, the arbitration component in the systems may be a pretrained component, and may be fine-tuned during the training operations described above. In some embodiments, some of the system may be trained/configured one layer at a time by freezing all the other pretrained weights, and fine tune the entire network/system with all the weights unfrozen.

In some of the embodiments, one of the ML models/branches is described as being a faster one as compared to the other ML model/branch in the system. In other embodiments, one of the ML models/branches or an additional ML model/branch in the system may be a bypass model/branch. In such embodiments, the arbitrator component 410, 510, 605 or 710 may be configured to determine if the present audio frame data is the same or is similar to (within a threshold similarity value) the previous audio frame data in the input audio data. For example, referring to FIG. 4, the trained arbitrator component 410 may process the audio frame 406 and determine that it is the same or similar to the audio frame 404, based on the audio frame 406 corresponding to the same phoneme as the audio frame 404 (e.g., the user 5 may say "tooooday" where the "o" sound extends over multiple audio frames). In this case, the trained arbitrator component 410 may send the audio frame 406 to the bypass model (not shown in FIG. 4), which may determine, based on the similarity between the audio frame 404 and the audio frame 406, that the output data 450 (e.g., the ASR data) corresponding to the audio frame 404 can be used as the output data (prediction) for the audio frame 406. In this manner, using the bypass model/branch, the system can save compute cost for processing sounds/phonemes (or other data, such as pixel data, depending on system configuration) that extend over multiple portions of the input data.

The embodiments described herein may be used to process data other than audio data and audio frames. For example, the embodiments can be used to process ASR data (e.g., token data, text data, ASR hypothesis, etc.) and perform NLU processing. In this example, the arbitrator component may use a fast ML model/branch (coarser, faster, smaller) to process words with less complex meanings (e.g., "is", "was", etc., or words not relating to intent(s) or entity(ies)), and may use a slow ML model/branch (more expressive, slower, larger) to process words with more complex meanings (e.g., words related to intent, words that have multiple meanings, words that relate to entities, etc.). In another example, the embodiments can be used to process image data and perform various image processing tasks, such as, object recognition, facial recognition, image classification, etc. In this example, the arbitrator component may determine to use a fast ML model/branch (coarser, faster, smaller) to process less complex pixels of the image data (e.g., background pixels, black/white pixels, etc.), and use a slow ML model/branch (more expressive, slower, larger) to process more complex pixels of the image data (e.g., multicolor pixels, etc.). In yet another example, the embodiments can be used to process sequences of images, where some images (depending the complexity of the data represented in the image) may be processed using a fast ML model/branch, and other images may be processed using a slow ML model/branch. In yet another example, the embodiments can be used to perform acoustic event detection. In this example, the arbitrator component may determine which ML model/branch to use to process an audio frame based on whether an acoustic event is represented in the audio frame.

Figure 8:
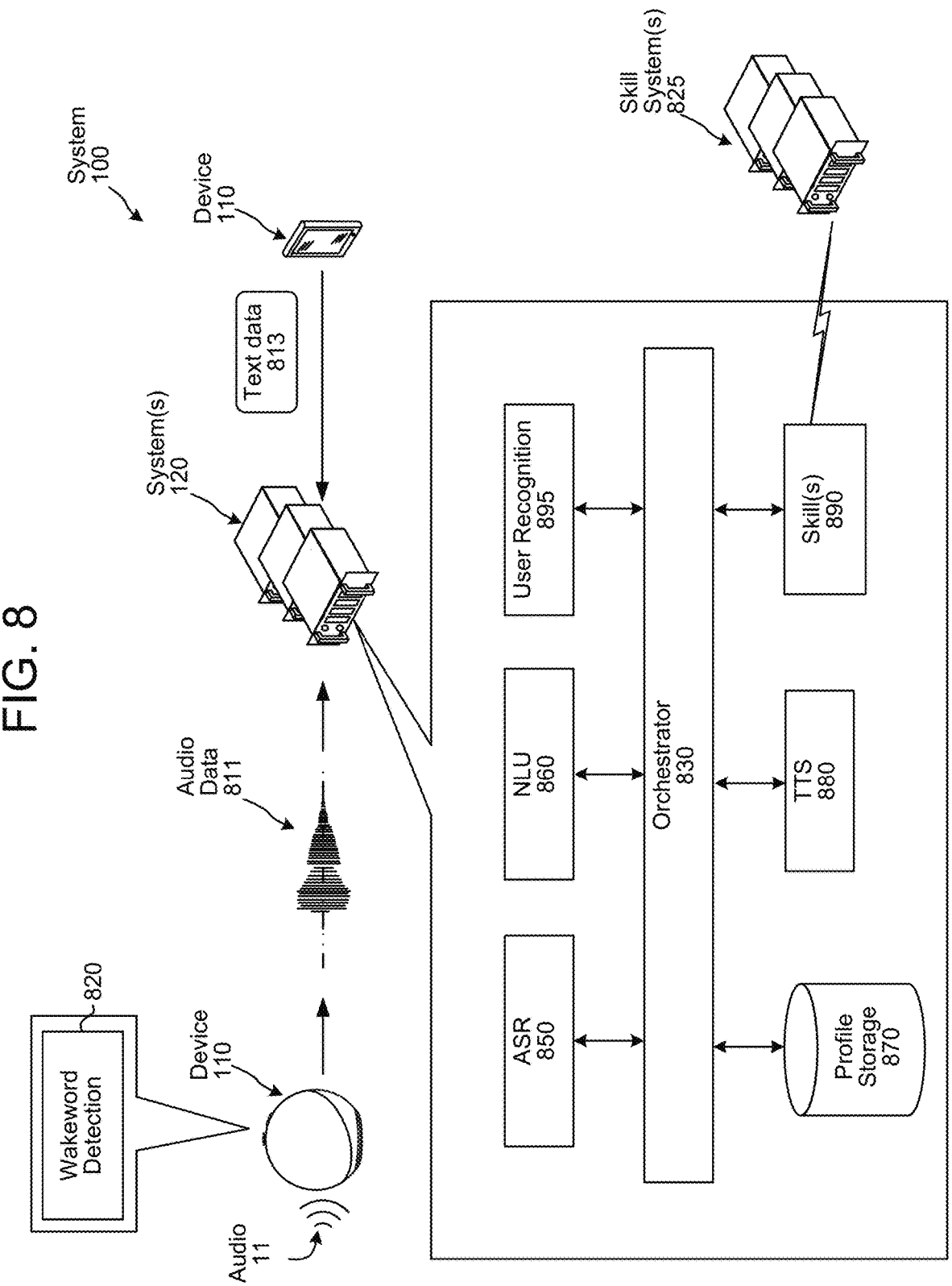
FIG. 8 is a conceptual diagram of components of a system, according to embodiments of the present disclosure.

The system 100 may operate using various components as illustrated in FIG. 8. The various components may be located on a same or different physical devices. Communication between various components may occur directly or across a network(s) 199.

A microphone or array of microphones (of or otherwise associated with a device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may determine if the speech is directed at the device 110/system 120. In at least some embodiments, such determination may be made using a wakeword detection component 820. The wakeword detection component 820 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 820 detects a wakeword, the device 110 may "wake" and begin transmitting audio data 811, representing the audio 11, to the system 120. The audio data 811 may include data corresponding to the detected wakeword, or the device 110 may remove the portion of the audio corresponding to the detected wakeword prior to sending the audio data 811 to the system 120.

The system 120 may include an orchestrator component 830 configured to, among other things, coordinate data transmissions between components of the system 120. The orchestrator component 830 may receive the audio data 811 from the device 110, and send the audio data 811 to an ASR component 850.

The ASR component 850 transcribes the audio data 811 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 811. Each ASR hypothesis may be associated with a score representing a confidence of ASR processing performed to determine the ASR hypothesis with which the score is associated.

The ASR component 850 interprets the speech in the audio data 811 based on a similarity between the audio data 811 and pre-established language models. For example, the ASR component 850 may compare the audio data 811 with models for sounds (e.g., subword units, such as phonemes, etc.) and sequences of sounds to identify words that match the sequence of sounds of the speech represented in the audio data 811.

In at least some instances, instead of the device 110 receiving audio 11, the device 110 may receive a text-based (e.g., typed) natural language user input. The device 110 may determine text data 813 representing the typed natural language user input, and may send the text data 813 to the system 120, wherein the text data 813 is received by the orchestrator component 830.

The orchestrator component 830 may send the text data 813 or ASR output data output, depending on the type of natural language user input received, to a NLU component 860. The NLU component 860 processes the ASR output data or text data to determine one or more NLU hypotheses embodied in NLU output data. The NLU component 860 may perform intent classification (IC) processing on the ASR output data or text data to determine an intent of the natural language user input. An intent corresponds to an action to be performed that is responsive to the natural language user input. To perform IC processing, the NLU component 860 may communicate with a database of words linked to intents. For example, a music intent database may link words and phrases such as "quiet," "volume off," and "mute" to a <Mute> intent. The NLU component 860 identifies potential intents by comparing words and phrases in ASR output data or text data to the words and phrases in an intents database. In at least some embodiments, the NLU component 860 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 860 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 860 may be linked to one or more grammar frameworks with "slots" to be filled. Each slot of a grammar framework corresponds to a portion of ASR output data or text data that the NLU component 860 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 860 may perform NER processing to identify words in ASR output data or text data as subject, object, verb, preposition, etc. based on grammar rules and/or models. Then, the NLU component 860 may perform IC processing that involves using the identified verb to identify an intent. Thereafter, the NLU component 860 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 860 may generate NLU output data including one or more NLU hypotheses, with each NLU hypothesis including the intent and slot(s) determined from IC processing and NER processing of the ASR output data or text data. In at least some embodiments, the NLU component 860 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 850 and the NLU component 860). In at least some embodiments, the system 120 may implement a spoken language understanding (SLU) component configured to process audio data 811 to determine NLU output data.

The SLU component may be equivalent to a combination of the ASR component 850 and the NLU component 860. Yet, the SLU component may process audio data 811 and directly determine the NLU output data, without an intermediate step of generating ASR output data. As such, the SLU component may take audio data 811 representing speech and attempt to make a semantic interpretation of the speech. That is, the SLU component may determine a meaning associated with the speech and then implement that meaning. For example, the SLU component may interpret audio data 811 representing speech from the user 5 in order to derive a desired action. The SLU component may output a most likely NLU hypothesis, or multiple NLU hypotheses associated with respective confidence or other scores (such as probability scores, etc.).

The NLU component 860 may send the NLU output data to the orchestrator component 830. The orchestrator component 830 may send the top-scoring NLU hypothesis (in the NLU output data) to a skill associated with the NLU hypothesis.

The system 120 may include one or more skill components 890 and/or may communicate with one or more skill systems 825 via one or more skill components 890. As used herein, a "skill" may refer to a skill component 890, a skill system 825, or a combination of a skill component 890 and a skill system 825. A skill may be configured to execute with respect to NLU output data. For example, for an NLU hypothesis including a <GetWeather> intent, the system 120 (and more particularly the orchestrator component 830) may invoke a weather skill to determine and output weather information for a geographic location represented in a user profile or corresponding to a location of the device 110 that captured the corresponding natural language user input. For further example, for an NLU hypothesis including a <BookRide> intent, the system 120 (and more particularly the orchestrator component 830) may invoke a taxi skill to book a requested ride. In another example, for an NLU hypothesis including a <BuyPizza> intent, the system 120 (and more particularly the orchestrator component 830) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 880 that determine audio data (e.g., synthesized speech) from text data using one or more different methods. Text data input to the TTS component 880 may come from a skill, the orchestrator component 830, or another component of the system 120.

In one method of synthesis called unit selection, the TTS component 880 matches text data against a database of recorded speech. The TTS component 880 selects matching units of recorded speech and concatenates the units together to form audio data. In another method of synthesis called parametric synthesis, the TTS component 880 varies parameters such as frequency, volume, and noise to determine audio data including an artificial speech waveform. Parametric synthesis uses a computerized voice generator, sometimes called a vocoder.

The system 120 may include a user recognition component 895. The user recognition component 895 may recognize one or more users using various data. The user recognition component 895 may take as input the audio data 811. The user recognition component 895 may perform user recognition by comparing speech characteristics, in the audio data 811, to stored speech characteristics of users (e.g., stored speech characteristics associated with user profile identifiers associated with the device 110 that determined the audio data 811). The user recognition component 895 may additionally or alternatively perform user recognition by comparing biometric data (e.g., fingerprint data, iris data, retina data, etc.), received by the system 120 in correlation with a natural language user input, to stored biometric data of users (e.g., stored biometric data associated with user profile identifiers associated with the device 110 that determined the audio data 811 or otherwise captured a user input). The user recognition component 895 may additionally or alternatively perform user recognition by comparing image data (e.g., including a representation of at least a feature of a user), received by the system 120 in correlation with a natural language user input, with stored image data including representations of features of different users (e.g., stored image data associated with user profile identifiers associated with the device 110 that determined the audio data 811 or otherwise captured a user input). The user recognition component 895 may perform other or additional user recognition processes, including those known in the art. For a particular user input, the user recognition component 895 may perform processing with respect to stored data of users associated with the device 110 that captured the user input.

The user recognition component 895 determines whether a user input originated from a particular user. For example, the user recognition component 895 may determine a first value representing a likelihood that a user input originated from a first user, a second value representing a likelihood that user input originated from a second user, etc. The user recognition component 895 may also determine an overall confidence regarding the accuracy of user recognition processing.

The user recognition component 895 may output a single user profile identifier corresponding to the most likely user that originated the user input. Alternatively, the user recognition component 895 may output multiple user profile identifiers (e.g., in the form of an N-best list) with respective values representing likelihoods of respective users originating the user input. The output of the user recognition component 895 may be used to inform NLU processing, processing performed by a skill, as well as processing performed by other components of the system 120 and/or other systems.

The system 120 may include profile storage 870. The profile storage 870 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 870 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 870 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith.

Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 870 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

Figure 9:
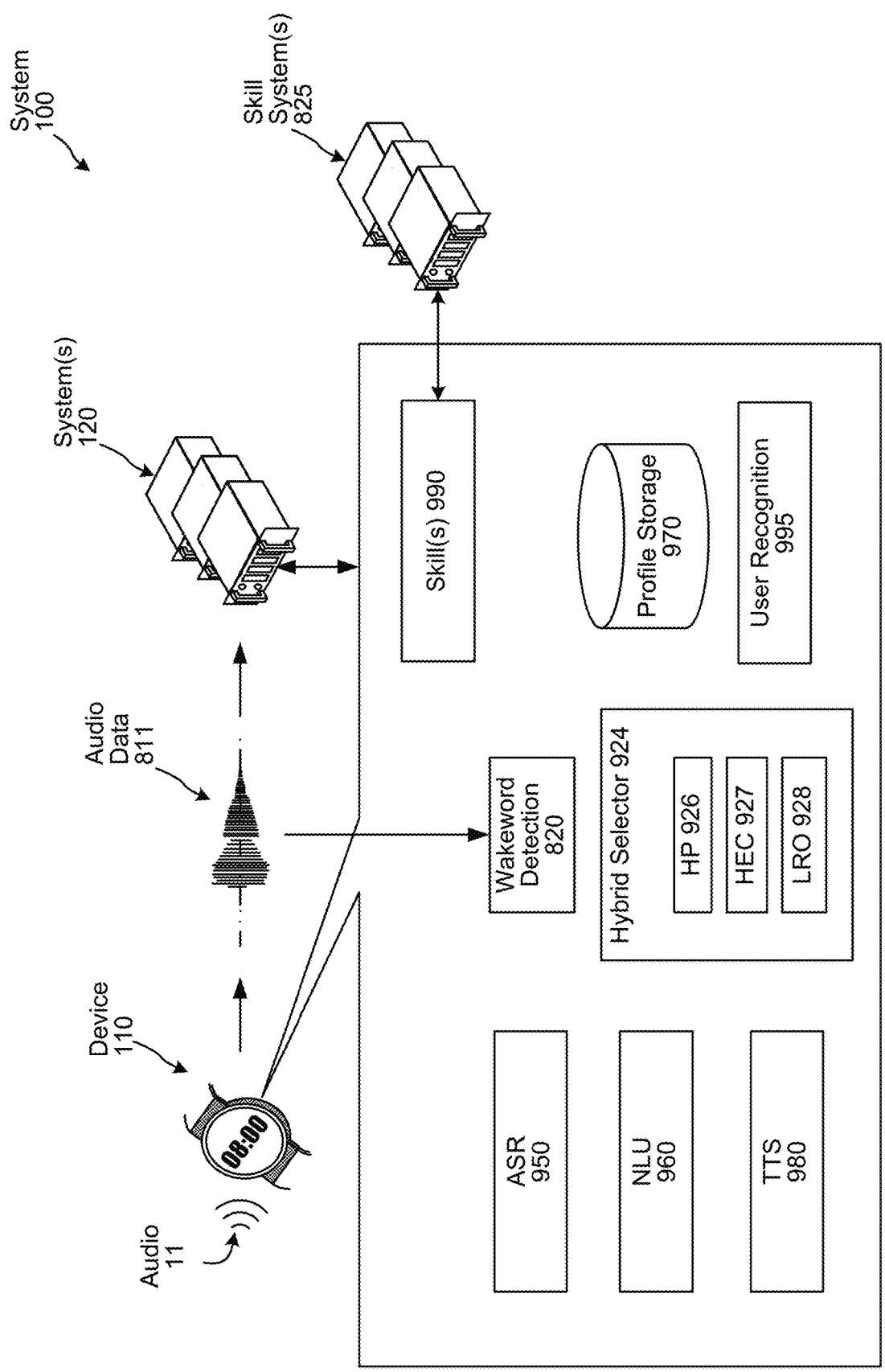
FIG. 9 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing, of the system 120 described above. FIG. 9 illustrates such a configured device 110.

In at least some embodiments, the system 120 may receive the audio data 811 from the device 110, to recognize speech corresponding to a spoken input in the received audio data 811, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 980) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 8, the device 110 may include a wakeword detection component 820 configured to compare the audio data 811 to stored models used to detect a wakeword (e.g., "Alexa") that indicates to the device 110 that the audio data 811 is to be processed for determining NLU output data (e.g., slot data that corresponds to a named entity, label data, and/or intent data, etc.). In at least some embodiments, a hybrid selector 924, of the device 110, may send the audio data 811 to the wakeword detection component 820. If the wakeword detection component 820 detects a wakeword in the audio data 811, the wakeword detection component 820 may send an indication of such detection to the hybrid selector 924. In response to receiving the indication, the hybrid selector 924 may send the audio data 811 to the system 120 and/or the ASR component 950. The wakeword detection component 820 may also send an indication, to the hybrid selector 924, representing a wakeword was not detected. In response to receiving such an indication, the hybrid selector 924 may refrain from sending the audio data 811 to the system 120, and may prevent the ASR component 950 from further processing the audio data 811. In this situation, the audio data 811 can be discarded.

The device 110 may conduct its own speech processing using on-device processing components, such as an ASR component 950 and an NLU 960, similar to the manner discussed above with respect to the ASR component 850 and the NLU component 860 of the system 120. In some embodiments, the device 110 may include a smaller model (e.g., ML model 240 described above) for speech processing, while the system(s) 120 may include a larger model (e.g., ML model 220 described above) for speech processing. In some embodiments, the arbitrator component (e.g., 410, 510, 605, or 710) described above may be included in the hybrid selector 924. In this manner, the hybrid selector 924 of the device 110 may process an audio frame and determine whether it should be processed on the device 110 using the smaller ML model/branch, or based on its complexity, it should be processed at the system(s) 120 using the larger ML model.

The device 110 may also internally include, or otherwise have access to, other components such as one or more skill components 990 capable of executing commands based on NLU output data or other results determined by the device 110/system 120, a user recognition component 995 (configured to process in a similar manner to that discussed above with respect to the user recognition component 895 of the system 120), profile storage 970 (configured to store similar profile data to that discussed above with respect to the profile storage 870 of the system 120), or other components. In at least some embodiments, the profile storage 970 may only store profile data for a user or group of users specifically associated with the device 110. Similar to as described above with respect to FIG. 8, a skill component 990 may communicate with a skill system(s) 825.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 924, of the device 110, may include a hybrid proxy (HP) 926 configured to proxy traffic to/from the system 120. For example, the HP 926 may be configured to send messages to/from a hybrid execution controller (HEC) 927 of the hybrid selector 924. For example, command/directive data received from the system 120 can be sent to the HEC 927 using the HP 926. The HP 926 may also be configured to allow the audio data 811 to pass to the system 120 while also receiving (e.g., intercepting) this audio data 811 and sending the audio data 811 to the HEC 927.

In at least some embodiments, the hybrid selector 924 may further include a local request orchestrator (LRO) 928 configured to notify the ASR component 950 about the availability of new audio data 811 that represents user speech, and to otherwise initiate the operations of on-device language processing when new audio data 811 becomes available. In general, the hybrid selector 924 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 811 is received, the HP 926 may allow the audio data 811 to pass through to the system 120 and the HP 926 may also input the audio data 811 to the on-device ASR component 950 by routing the audio data 811 through the HEC 927 of the hybrid selector 924, whereby the LRO 928 notifies the ASR component 950 of the audio data 811. At this point, the hybrid selector 924 may wait for response data from either or both of the system 120 or the on-device language processing components. However, the disclosure is not limited thereto, and in some examples the hybrid selector 924 may send the audio data 811 only to the on-device ASR component 950 without departing from the disclosure. For example, the device 110 may process the audio data 811 on-device without sending the audio data 811 to the system 120.

The on-device ASR component 950 is configured to receive the audio data 811 from the hybrid selector 924, and to recognize speech in the audio data 811, and the on-device NLU component 960 is configured to determine a user intent from the recognized speech, and to determine how to act on the user intent by generating NLU output data which may include directive data (e.g., instructing a component to perform an action). Such NLU output data may take a form similar to that as determined by the NLU component 860 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

An NLU hypothesis (output by the NLU component 960) may be selected as usable to respond to a natural language user input, and local response data may be sent (e.g., local NLU output data, local knowledge base information, internet search results, and/or local directive data) to the hybrid selector 924, such as a "ReadyToExecute" response. The hybrid selector 924 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 811 to the system 120, and the response data from the system 120 may include the unique identifier to identify which natural language user input the response data corresponds.

In at least some embodiments, the device 110 may include, or be configured to use, one or more skill components 990 that may work similarly to the skill component(s) 890 implemented by the system 120. The skill component(s) 990 may correspond to one or more domains that are used in order to determine how to act on a spoken input in a particular way, such as by outputting a directive that corresponds to the determined intent, and which can be processed to implement the desired operation. The skill component(s) 990 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 825. For example, a skill system 825 may be located in a remote environment (e.g., separate location) such that the device 110 may only communicate with the skill system 825 via the network(s) 199. However, the disclosure is not limited thereto. For example, in at least some embodiments, a skill system 825 may be configured in a local environment (e.g., home server and/or the like) such that the device 110 may communicate with the skill system 825 via a private network, such as a local area network (LAN).

As used herein, a "skill" may refer to a skill component 990, a skill system 825, or a combination of a skill component 990 and a skill system 825.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)), random forests, isolation forests, and others. As an example, a neural network typically includes an input layer, an output layer and one or more intermediate hidden layers where the input layer is configured to take in a certain kind of data and the output layer is configured to output the desired kind of data resulting from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Figure 10:
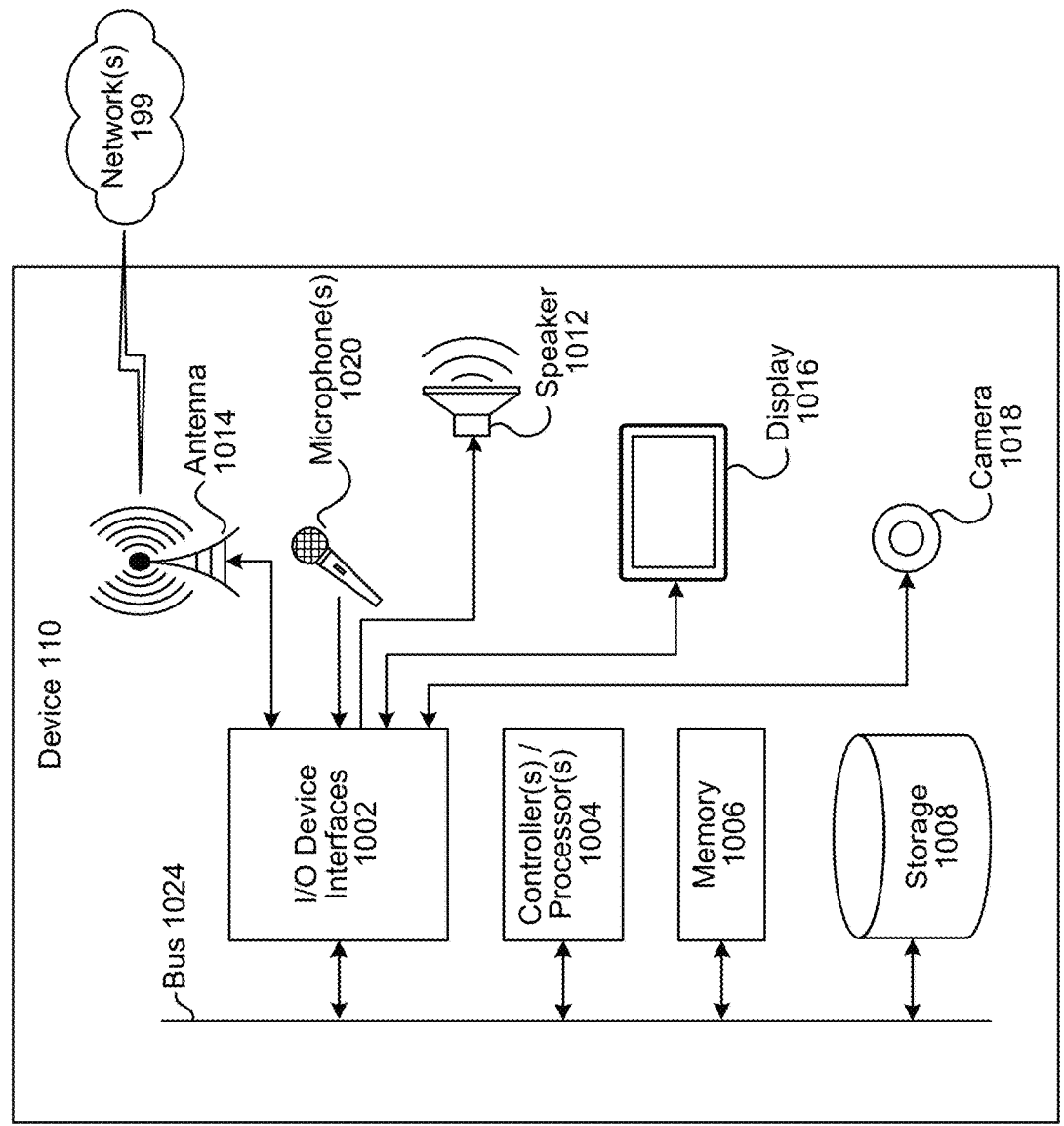
FIG. 10 is a block diagram conceptually illustrating example components of a device, according to embodiments of the present disclosure.

FIG. 10 is a block diagram conceptually illustrating example components of a device 110 according to the present disclosure. FIG. 11 is a block diagram conceptually illustrating example components of a system, such as the system 120 or a skill system 825. A system (120/825) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/825) may be included in the system 100 of the present disclosure, such as one or more systems 120 for performing ASR processing, one or more systems 120 for performing NLU processing, and one or more skill systems 825, etc. In operation, each of these systems may include computer-readable and computer-executable instructions that reside on the respective device (120/825), as will be discussed further below.

Each of these devices (110/120/825) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/825) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/825) may also be connected to removable or external non-volatile memory and/or storage (such as a removable memory card, memory key drive, networked storage, etc.) through respective input/output device interfaces (1002/1102).

Computer instructions for operating each device (110/120/825) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/825) includes input/output device interfaces (1002/1102). A variety of components may be connected through the input/output device interfaces (1002/1102), as will be discussed further below. Additionally, each device (110/120/825) may include an address/data bus (1024/1124) for conveying data among components of the respective device. Each component within a device (110/120/825) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to a network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device 110, the system 120, and/or a skill system 825 may include their own dedicated processors, memory, and/or storage. Alternatively, one or more of the components of the device 110, the system 120, and/or a skill system 825 may utilize the I/O interfaces (1002/1102), processor(s) (1004/1104), memory (1006/1106), and/or storage (1008/1108) of the device(s) 110, system 120, or the skill system 825, respectively. Thus, the ASR component 850 may have its own I/O interface(s), processor(s), memory, and/or storage; the NLU component 860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 825, as described herein, are illustrative, and may be located as a stand-alone device or may be included, in whole or in part, as a component of a larger device or system.

As illustrated in FIG. 12, multiple devices (110a-1101) may process as part of the system 100. The network(s) 199 may include a local or private network or may include a wide network such as the Internet. Devices may be connected to the network(s) 199 through either wired or wireless connections. For example, the system 100 may include a speech-controlled device(s) 110a, a smart phone(s) 110b, a smart watch(s) 110c, a tablet computer(s) 110d, a vehicle(s) 110e, a speech-controlled display device(s) with a display 110f, a smart television(s) 110g, a washer(s)/dryer(s) 110h, a refrigerator(s) 110i, a microwave(s) 110j, earbuds 110l, and/or a wearable ring(s) 110m.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, at a device, audio data representing a spoken natural language input;
determining, at the device, a plurality of audio frames from the audio data;
processing, at the device and using a first trained model, a first audio frame from the plurality of audio frames, wherein the first trained model is configured to select either (a) a second trained model configured to perform automatic speech recognition (ASR) or (b) a third trained model configured to perform ASR to process an input audio frame, wherein the third trained model uses less computational resources than the second trained model;
determining, based on the processing of the first audio frame using the first trained model, to process the first audio frame using the second trained model;
determining, at the device, using the second trained model and the first audio frame, first ASR data corresponding to a first portion of the spoken natural language input represented in the first audio frame;
processing, at the device and using the first trained model, a second audio frame from the plurality of audio frames;
determining, based on the processing of the second audio frame using the first trained model, to process the second audio frame using the third trained model;
determining, at the device, using the third trained model and the second audio frame, second ASR data corresponding to a second portion of the spoken natural language input represented in the second audio frame;
determining, at the device, first output data using at least the first ASR data and the second ASR data, the first output data corresponding to the audio data, the first output data corresponding to a response to the spoken natural language input; and sending the first output data to a natural language understanding (NLU) component for further processing.

2. The computer-implemented method of claim 1, further comprising:
determining that the second trained model outputs data corresponding to a first dimension;
determining that the third trained model processes data corresponding to a second dimension;
determining, at the device, third ASR data using the first ASR data, wherein the third ASR data corresponds to the second dimension, and
wherein determining the second ASR data comprises determining the second ASR data using the third trained model, the second audio frame, and the third ASR data.

3. The computer-implemented method of claim 1, further comprising:
processing the first audio frame using a first layer of the second trained model to generate first feature data, and
wherein processing, using the first trained model, the first audio frame comprises processing the first feature data to determine that the first audio frame is to be processed using the second trained model.

4. The computer-implemented method of claim 1, further comprising:
determining a third audio frame, from the plurality of audio frames, that is consecutive to the second audio frame;
processing, using the first trained model, the third audio frame to determine that the third audio frame corresponds to features similar to the second audio frame;
based on determining that the third audio frame corresponds to features similar to the second audio frame, associating the second ASR data with the third audio frame, and
wherein determining the first output data comprises determining a first portion of the first output data comprising the first ASR data, a second portion of the first output data comprising the second ASR data, and a third portion of the first output data comprising the second ASR data.

5. A computer-implemented method comprising:
receiving input data corresponding to a user input, the input data comprising at least a first portion corresponding to a first time portion and a second portion corresponding to a second time portion subsequent to the first time portion;
processing, using an arbitrator component, the first portion to select either (a) a first trained model configured to perform a type of processing or (b) a second trained model configured to perform the type of processing to process the first portion;
determining, using the arbitrator component, that the first portion is to be processed using the first trained model;
determining, using the first trained model and the first portion, first data;
processing, using the arbitrator component, the second portion to select either (a) the first trained model or (b) the second trained model to process the second portion;
determining, using the arbitrator component, the second portion is to be processed using the second trained model;
determining, using the second trained model and the second portion, second data; and
determining, using at least the first data and the second data, output data corresponding to a response to the user input.

6. The computer-implemented method of claim 5, further comprising:
receiving audio data representing a spoken natural language input comprising at least a first audio frame and a second audio frame,
determining, using the arbitrator component, that the first audio frame is to be processed using the first trained model to perform ASR processing,
determining, using the arbitrator component, that the second audio frame is to be processed using the second trained model to perform ASR processing, and
determining the output data comprises determining the output data representing the spoken natural language input.

7. The computer-implemented method of claim 5, further comprising using less computational resources to process the first trained model than to process the second trained model.

8. The computer-implemented method of claim 5, further comprising:
processing the first portion using a first layer of the first trained model to generate first feature data, and
determining, using the first feature data, that the first portion of the input data is to be processed using the first trained model.

9. The computer-implemented method of claim 5, wherein processing the first portion using the arbitrator component comprises processing the first portion using a third trained model configured to determine whether data is to be processed using the first trained model or the second trained model.

10. The computer-implemented method of claim 5, wherein:
receiving the input data comprises receiving audio data using at least one microphone of a device, the audio data comprising at least a first audio frame and a second audio frame,
determining, at the device and using the arbitrator component, that the first audio frame is to be processed using the first trained model;
determining, at the device and using the arbitrator component, that the second audio frame is be processed using the second trained model; and
determining the output data comprises determining the output data at the device.

11. The computer-implemented method of claim 5, wherein the first trained model outputs data corresponding to a first dimension and the second trained model outputs data corresponding to a second dimension, and the method further comprises:
determining, using the first data, third data corresponding to the second dimension, and
wherein determining the second data further comprises determining the second data using the second portion, the second trained model, and the third data.

12. The computer-implemented method of claim 5, further comprising prior to receiving the input data:
determining training data including at least a third portion of data of a same type as the input data;
processing the training data using a first machine learning model to generate first model data;
processing the training data using a second machine learning model to generate second model data;
processing the training data using a third machine learning model to generate third model data;
processing the second model data and the third model data to generate updated first model data;

using the second model data to generate the first trained model;
using the third model data to generate the second trained model; and
using the updated first model data to generate a third trained model, the third trained model configured to determine whether data is to be processed by the first trained model or the second trained model.

13. A system comprising:
at least one processor; and
at least one memory including instructions that, when executed by the at least one processor, cause the system to:
   receive input data corresponding to a user input, the input data comprising at least a first portion corresponding to a first time portion and a second portion corresponding to a second time portion subsequent to the first time portion;
   process, using an arbitrator component, the first portion to select either (a) a first trained model configured to perform a type of processing or (b) a second trained model configured to perform the type of processing to process the first portion;
   determine, using the arbitrator component, that the first portion is to be processed using the first trained model;
   determine, using the first trained model and the first portion, first data;
   process, using the arbitrator component, the second portion to select either (a) the first trained model or (b) the second trained model to process the second portion;
   determine, using the arbitrator component, that the second portion is to be processed using the second trained model;
   determine, using the second trained model and the second portion, second data; and
   determine, using at least the first data and the second data, output data corresponding to a response to the user input.

14. The system of claim 13, wherein the at least one memory further includes instructions that, when executed by the at least one processor, further cause the system to:
   receive the input data comprising audio data representing a spoken natural language input comprising at least a first audio frame and a second audio frame,
   wherein the first portion is the first audio frame and the second portion is the second audio frame,
   wherein the first trained model and the second trained model are configured to perform ASR processing, and
   wherein the output data corresponding to the input data represents the spoken natural language input.

15. The system of claim 13, wherein the at least one memory further includes instructions that, when executed by the at least one processor, further cause the system to use less computational resources to process the first trained model than to process the second trained model.

16. The system of claim 13, wherein the at least one memory further includes instructions that, when executed by the at least one processor, further cause the system to:
   process the first portion of the input data using a first layer of the first trained model to generate first feature data, and
   determine, using the first feature data, that the first portion is to be processed using the first trained model.

17. The system of claim 13, wherein the instructions that, when executed by the at least one processor, cause the system to process the first portion using the arbitrator component causes the system to process the first portion using a third trained model configured to determine whether data is to be processed using the first trained model or the second trained model.

18. The system of claim 13, wherein the at least one memory further includes instructions that, when executed by the at least one processor, further cause the system to:
   receive the input data comprises receiving audio data using at least one microphone of a device, the audio data comprising at least a first audio frame and a second audio frame,
   determine, at the device and using the arbitrator component, the first audio frame is to be processed using the first trained model;
   determine, at the device and using the arbitrator component, the second audio frame is to be processed using the second trained model; and
   wherein the instructions that cause the system to determine the output data causes the system to determine the output data at the device.

19. The system of claim 13, wherein the first trained model outputs data corresponding to a first dimension and the second trained model outputs data corresponding to a second dimension, and wherein the at least one memory further includes instructions that, when executed by the at least one processor, further cause the system to:
   determine, using the first data, third data corresponding to the second dimension, and wherein determining the second data further comprises determining the second data using the second portion, the second trained model, and the third data.

20. The system of claim 13, wherein the at least one memory further includes instructions that, when executed by the at least one processor, further cause the system to, prior to receiving the input data:
   determine training data including at least third data of a same type as the input data;
   process the training data using a first machine learning model to generate first model data;
   process the training data using a second machine learning model to generate second model data;
   process the training data using a third machine learning model to generate third model data;
   process the second model data and the third model data to generate updated first model data;
   use the second model data to generate the first trained model;
   use the third model data to generate the second trained model; and
   use the updated first model data to generate a third trained model, the third trained model configured to determine whether audio frame data is to be processed by the first trained model or the second trained model.

* * * * *